United States Patent
Fukuda et al.

(10) Patent No.: US 6,219,111 B1
(45) Date of Patent: Apr. 17, 2001

(54) PROJECTION-TYPE LIQUID CRYSTAL DISPLAY APPARATUS

(75) Inventors: Toshihiro Fukuda, Kanagawa; Akira Nakamura, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/159,757

(22) Filed: Sep. 24, 1998

(30) Foreign Application Priority Data

Sep. 30, 1997 (JP) ................................................... 9-267507

(51) Int. Cl.$^7$ ................................................. G02F 1/1335
(52) U.S. Cl. ................. 349/5; 349/7; 349/8; 349/66; 349/95
(58) Field of Search ................. 349/5, 7, 8, 66, 349/95; 353/34, 49, 51

(56) References Cited

U.S. PATENT DOCUMENTS

| | | |
|---|---|---|
| 4,686,519 | 8/1987 | Yoshida et al. . |
| 5,161,042 | 11/1992 | Hamada ................................. 359/41 |
| 5,418,583 | 5/1995 | Masumoto . |
| 6,050,689 | * 4/2000 | Nakamura et al. ..................... 353/31 |
| 6,067,193 | * 5/2000 | Sekine et al. .......................... 359/489 |
| 6,092,901 | * 7/2000 | Hashizume et al. .................... 362/19 |

FOREIGN PATENT DOCUMENTS

| | | |
|---|---|---|
| 0 848 274 A1 | 6/1998 | (EP) . |
| 5-346557 | 12/1993 | (JP) . |
| 07294906 | 11/1995 | (JP) . |
| WO 97/23859 | 7/1997 | (WO) . |

OTHER PUBLICATIONS

"Asia Display '95," Proceedings of the Fifteenth International Display Research Conference, Oct. 16–18, 1995, pp. 887–890.

* cited by examiner

*Primary Examiner*—James A Dudek
(74) *Attorney, Agent, or Firm*—Ronald P. Kananen; Rader, Fishman & Grauer

(57) ABSTRACT

A projection-type liquid crystal display apparatus is provided for preventing a reduction in image quality due to deposited foreign substances such as dust, arc fluctuations of a light source and so on. An optical illumination system of a liquid crystal panel includes an integrator having a first lens array made up of a plurality of lens elements and a second lens array made up of lens element corresponding to the lens elements of the first lens array. A single ray bundle incident on the first lens array is split into a plurality of split ray bundles by the first lens array and pass through the corresponding lens elements of the second lens array and further through a collimator lens, dichroic mirrors and enter the liquid crystal panel. The liquid crystal panel is illuminated with the ray bundles sent from all the lens elements of the first lens array in a superimposing manner and the illuminance distribution is made even.

8 Claims, 19 Drawing Sheets

PROJECTION-TYPE LIQUID CRYSTAL DISPLAY APPARATUS

BACKGROUND OF THE INVENTION

1. Field of the Invention

The present invention relates to a projection-type liquid crystal display apparatus for displaying an image onto a screen by enlarging and projecting an image on a liquid crystal panel by means of an optical projection system and particularly to a projection-type liquid crystal display apparatus comprising a single liquid crystal panel without any color filter.

2. Description of the Related Art

Projection-type liquid crystal apparatuses such as liquid crystal projectors and liquid crystal projection television sets have been developed for enlarging and projecting an image on a liquid crystal panel as an optical switching device by means of an optical projection system. Such liquid crystal display apparatuses include a single-panel apparatus comprising a liquid crystal panel having three color filters (CF) of blue (B), red (R) and green (G) and a triple-panel apparatus comprising monochrome liquid crystal panels each provided in optical paths of B, R and G, respectively. The single-panel apparatus has a simple configuration and reductions in size, weight and cost are easily achieved. However, it is difficult to achieve high luminance since the color filters absorb much light. Cooling of the apparatus is thereby affected as well.

In order to overcome these problems, single-panel color liquid crystal display apparatuses are disclosed in, for example, Japanese Patent Application Laid-open No. 4-60538 (1992) that corresponds to U.S. Pat. No. 5,161,042 and 'Asia Display '95 (p. 887)' wherein one condenser microlens is opposed to every three pixels. Three color rays of B, R and G are entered to each microlens from mutually different directions and condensed. The light sent out from the microlens is entered to each of the three pixels corresponding to three colors of B, R and G, respectively. In the color liquid crystal display apparatus, it is possible to effectively utilize light incident on regions between pixels (black matrix regions where thin film transistors [TFf], that is, switching devices for driving pixels are formed) as well. The substantial aperture ratio (the ratio of effective pixel area to the whole pixel area) is thereby increased and high illuminance is achieved, accordingly. Since such a projection-type liquid crystal display apparatus comprises a single liquid crystal panel with a microlens array instead of a color filter, the apparatus of this type will be called projection-type liquid crystal display apparatus of the color-filterless single-panel microlens system.

FIG. 1 is a schematic view of a proposed optical system used in the projection-type liquid crystal display apparatus of the color-filterless single-panel microlens system. The apparatus comprises: a light source 501 for emitting white light; a UV-IR cut filter 502 for removing ultraviolet and infrared rays from the white light emitted from the light source 501; a glass rod integrator 503 for unifying the intensity distribution in a cross section of a bundle of rays passing through the UV-IR cut filter 502; a relay lens 504 for condensing the ray bundle sent out from the glass rod integrator 503; and a collimator lens 505 for transforming the ray bundle sent out from the relay lens 504 into a nearly parallel ray bundle. The display apparatus further comprises: dichroic mirrors 506B, 506R and 506G placed in the optical path behind the collimator lens 505 for splitting the white ray bundle sent out from collimator lens 505 into color rays of B, R and G and reflecting the color rays at angles different from one another; an incident polarizing plate 507 for transforming the color rays split by the dichroic mirrors 506B, 506R and 506G into light linearly polarized in a specific direction; a liquid crystal panel 508 for performing intensity modulation on the color rays passing through the polarizing plate 507 based on color image signals; and a projection lens 509 for condensing the light sent out from the liquid crystal panel 508 and projecting the light onto a screen 509 and composing the light.

The light source 501 is typically made up of an emitter 501a of metal-halide and a concave mirror 501b of rotation symmetry. The glass rod integrator 503 is made of glass in the shape of prism and unifies the intensity distribution in a cross section of the ray bundle incident from one end face of the integrator by reflecting the ray bundle inside a number of times and emits the ray bundle from the other end face. The liquid crystal panel 508 is a panel of the color-filterless microlens system, including pixel electrodes (not shown) regularly arranged in two dimensions in correspondence with the colors of R, G and B, condenser microlenses (not shown) each of which is opposed to every three pixel electrodes of R, G and B with a liquid crystal layer not shown in between, and an outgoing polarizing plate not shown. The condenser microlens mentioned above condenses rays of three colors B, R and G split by the dichroic mirrors 506B, 506R and 506G and entering at mutually different angles. The condenser microlens then has the rays each enter the respective pixels corresponding to the three colors of B, R and G.

In the projection-type liquid crystal display apparatus with such a configuration, spatial modulation is selectively performed on each of the rays of three colors B, R and G incident into the liquid crystal layer provided for each pixel, based on a color image signal for each color applied to each pixel electrode of the liquid crystal panel 508. The rays of color light modulated at the liquid crystal panel 508 form an image on the screen 510 by the projection lens 509 and the colors are thus synthesized. A color image is thereby projected onto the screen 510.

As described above, the projection-type liquid crystal display apparatus utilizes the glass rod integrator 503 as a means for smoothing the luminous distribution on the liquid crystal panel 508. In this case, the outgoing face of the glass rod integrator 503 is conjugated with the surface of the liquid crystal panel 508. As a result, a foreign substance such as dust deposited on the outgoing face of the integrator 503 may be enlarged and projected onto the screen 510. The quality of the image is thereby significantly reduced.

In the display apparatus, although the intensity distribution in a cross section of the outgoing ray bundle is smoothed to some degree by internal reflection of the glass rod integrator 503, some light directly reaches the outgoing face without internal reflection if the length of the integrator 503 is reduced in order to decrease the size of the apparatus as a whole. Therefore, there is limitation on smoothing the illuminance distribution on the liquid crystal panel 508. Consequently, if arc fluctuations occur in the emitter of the light source 501, the fluctuations result in flicker of the image. The image quality is thereby reduced.

In Japanese Patent Application Laid-open No. 5-346557 (1993), for example, a projection-type triple-panel liquid crystal display apparatus utilizing a multiple lens array integrator is disclosed. Instead of the rod integrator, the apparatus comprises the multiple lens array integrator made up of a first lens array wherein a plurality of lenses are arranged in two dimensions and a second lens array wherein a plurality of lenses paring up with the respective lenses of the first lens array are arranged in two dimensions.

However, the multiple lens array integrator disclosed in the publication mentioned above is particularly developed for a related-art projection-type liquid crystal display apparatus using a liquid crystal panel with color filters and a triple-panel display apparatus. The configuration of the multiple lens array integrator is therefore not applicable to the apparatus of the colorfilterless single-panel microlens system. No suggestion is made in the above-mentioned publication for such applications of the integrator, either. There are reasons as follows.

The suggested apparatus with color filters and triple-panel apparatus do not require a high degree of parallelism of light illuminating the liquid crystal panel, owing to the properties of the liquid crystal panel itself. The image quality is therefore not affected even if the incident divergence angle (or converging angle) is 14 degrees or above. The incident divergence angle is a variation range of incident angles of every ray of light incident on a specific pixel on the liquid crystal panel. However, if the incident divergence angle is too large, the outgoing divergence angle is thereby increased as well and a load applied to the projection lens becomes too heavy. The incident divergence angle is therefore typically around 14 degrees, the cost of the apparatus being considered.

As thus described, since the restriction on the incident divergence angle at the liquid crystal panel is moderate for the apparatus with color filters and triple-panel apparatus, it is possible to relatively increase the size of the second lens array that functions as a diaphragm. In the above-mentioned publication, an example of the second lens array wherein the diameter of the circumscribed circle is of the order of 70 mm is disclosed.

In contrast, the apparatus of the color-filterless single-panel microlens system performs color image display by entering three colors of B, R and G to each microlens from mutually different directions and entering the light condensed by the microlens to each of the three pixels of B, R and G, respectively. If the incident divergence angle of light illuminating the liquid crystal panel is large, one color light (B light, for example) may enter not only the pixel for B color but also a neighboring pixel (the pixel for R or G) and color mixture results. The color purity of the displayed image is thereby reduced and the quality of the image is significantly affected. It is thus required to reduce the incident divergence angle of light incident on the liquid crystal panel to a sufficiently small angle.

As thus described, the limitation on the incident divergence angle at the liquid crystal panel is specifically strict for the apparatus of the colorfilterless single-panel microlens system, compared to the apparatuses of other schemes. It is thus difficult to achieve sufficient image quality with the techniques disclosed in the foregoing publication.

Even if the strict limitation on the incident divergence angle is observed, the quantity of light reaching the liquid crystal panel is inevitably reduced, accordingly. Another problem may result that it is difficult to obtain sufficient illuminance of the image.

SUMMARY OF THE INVENTION

It is a first object of the invention to provide a projection-type liquid crystal display apparatus for preventing a reduction in image quality due to deposited foreign substances, arc fluctuations of the light source and so on. It is a second object of the invention to provide a projection-type liquid crystal display apparatus for preventing a reduction in color purity by reducing the incident divergence angle of light illuminating a liquid crystal panel and for obtaining a projected image of high luminance through efficiently using the quantity of light from the light source.

A projection-type liquid crystal display apparatus comprises: a first lens array, including a plurality of lens elements arranged in two dimensions, for splitting an incident single ray bundle into a plurality of split ray bundles by the lens elements and sending out the split ray bundles and condensing the split ray bundles; a second lens array including a plurality of lens elements arranged in two dimensions in correspondence with the lens elements of the first lens array and sending out the split ray bundles incident thereon through the respective lens elements of the first lens array in such a direction that the split ray bundles overlap or are superimposed on one another; a color separation means for separating the ray bundles sent out from the second lens array into rays of a plurality of primary colors and sending out the color rays at angles different from one another; and a single liquid crystal panel including: a liquid crystal device having pixels corresponding to the primary colors and selectively modulating the color rays incident on the pixels; and condensing means each provided for every group of the pixels and condensing the color rays sent out from the color separation means and incident at the angles different from one another and having the color rays enter the pixels of the corresponding colors.

It is preferable that the shape of the whole second lens array is nearly similar to the shape of an aperture of each of the pixels of the liquid crystal device and the whole second lens array is conjugated with or nearly conjugated with each of the pixels. Furthermore, it is preferable that the lens elements of the second lens array each have a size and a shape that correspond to an optical image formed by the split ray bundle sent out from the corresponding lens element of the first lens array. Furthermore, it is preferable that the whole first lens array has a size capable of receiving almost all the single ray bundle and the lens elements of the first lens array are each decentered so that the split ray bundles sent out from the lens elements converge on the corresponding lens elements of the second lens array. In addition, it is preferable that the shape of each of the lens elements of the first lens array is nearly similar to the shape of the liquid crystal panel and each of the lens elements of the first lens array is conjugated with or nearly conjugated with the liquid crystal panel. It is preferable that the apparatus further comprises a splitting and combining means. The means is provided for splitting an incident ray bundle into rays linearly polarized in one direction and rays linearly polarized in another direction orthogonal to the one direction, transforming the rays linearly polarized in one of the directions into rays linearly polarized in the other direction, combining the transformed linearly polarized rays and the untransformed linearly polarized rays into rays linearly polarized in a single direction and sending out the rays.

According to the projection-type liquid crystal display apparatus of the invention, the split ray bundles split by the lens elements of the first lens i:array each enter the respective lens elements of the second lens array. The split ray bundles incident on the lens elements of the second lens array are sent out in such a direction that the split ray bundles are superimposed on one another. The split ray bundles sent out from the lens elements of the second lens array are separated into rays of a plurality of primary colors by the color separation means and sent out at angles different from one another. The color rays then enter the liquid crystal panel. As a result, all the split ray bundles split by the lens elements of the first lens array are finally projected onto the liquid crystal panel in a superimposing manner. The color rays incident on the liquid crystal panel are condensed by the condensing means and enter the pixels of the corresponding colors and are selectively modulated in the pixels.

If the shape of the whole second lens array is nearly similar to the shape of an aperture of each of the pixels of the liquid crystal device and the whole second lens array is conjugated with or nearly conjugated with each of the pixels, a proper limit is imposed on the incident divergence angle of the ray bundle incident on the liquid crystal panel. Furthermore, if the lens elements of the second lens array each have a size and a shape that correspond to an optical image formed by the split ray bundle sent out from the corresponding lens element of the first lens array, most of the light incident on the second lens array reach the liquid crystal panel. Furthermore, if the whole first lens array has a size capable of receiving almost all the single ray bundle and the lens elements of the first lens array are each decentered so that the split ray bundles sent out from the lens elements converge on the corresponding lens elements of the first lens array, vignetting of the incident single ray bundle by the first lens array is prevented and the incident light is thereby utilized with high efficiency. In addition, if the shape of each of the lens elements of the first lens array is nearly similar to the shape of the liquid crystal panel and each of the lens elements of the first lens array is conjugated with or nearly conjugated with the liquid crystal panel, the split ray bundles split by the lens elements of the first lens array are superimposed and projected onto the liquid crystal panel without loss. If the apparatus further comprises the splitting and combining means with the configuration described above, almost all the incident rays are formed into rays linearly polarized in a specific direction and utilized. The light quantity lost on a polarizing plate generally placed in front of the liquid crystal panel is thereby reduced.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

[First Embodiment]

Figure 1:
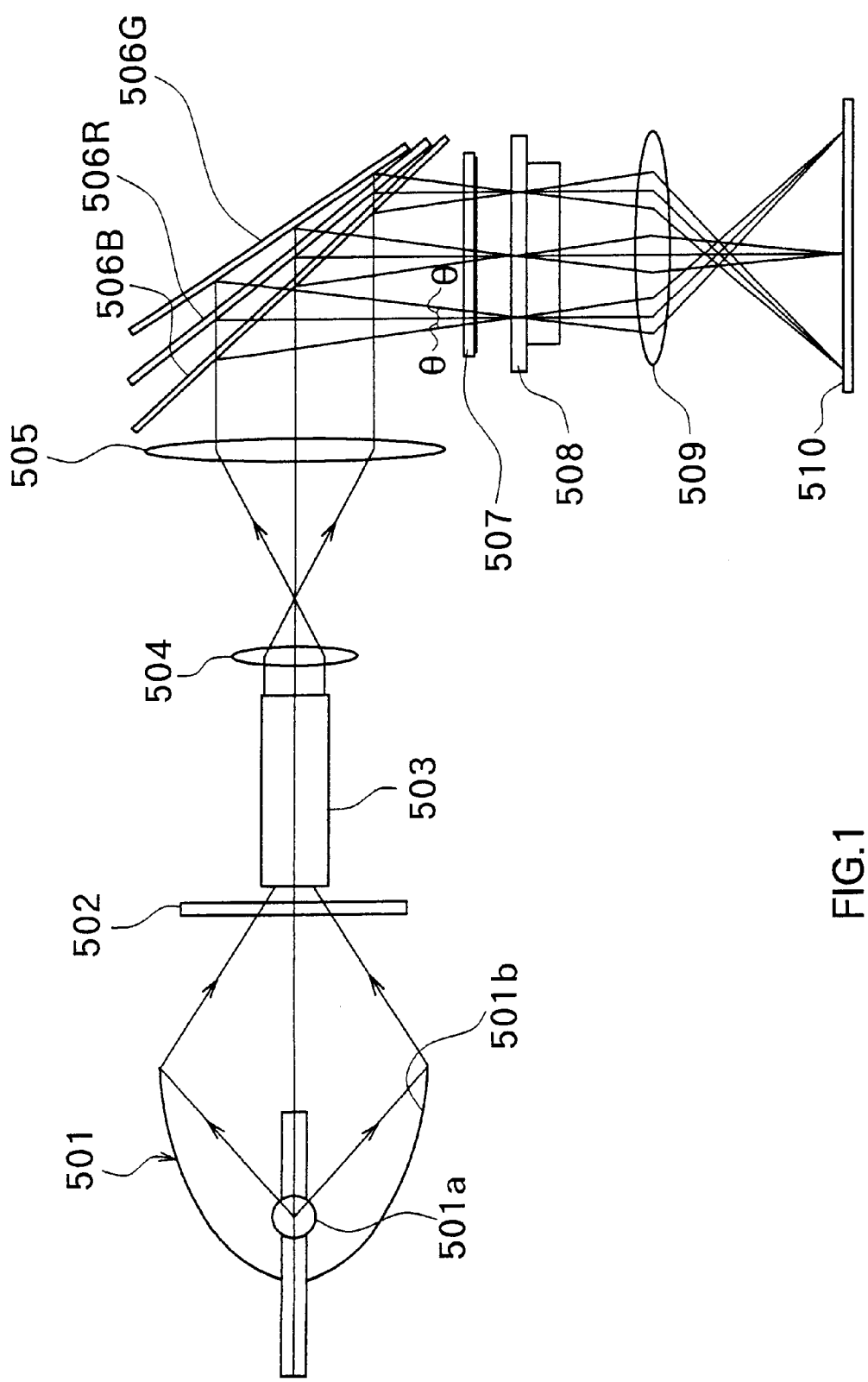
FIG. 1. is a schematic top view of an optical system of a projection-type liquid crystal display apparatus of related art.
Figure 2:
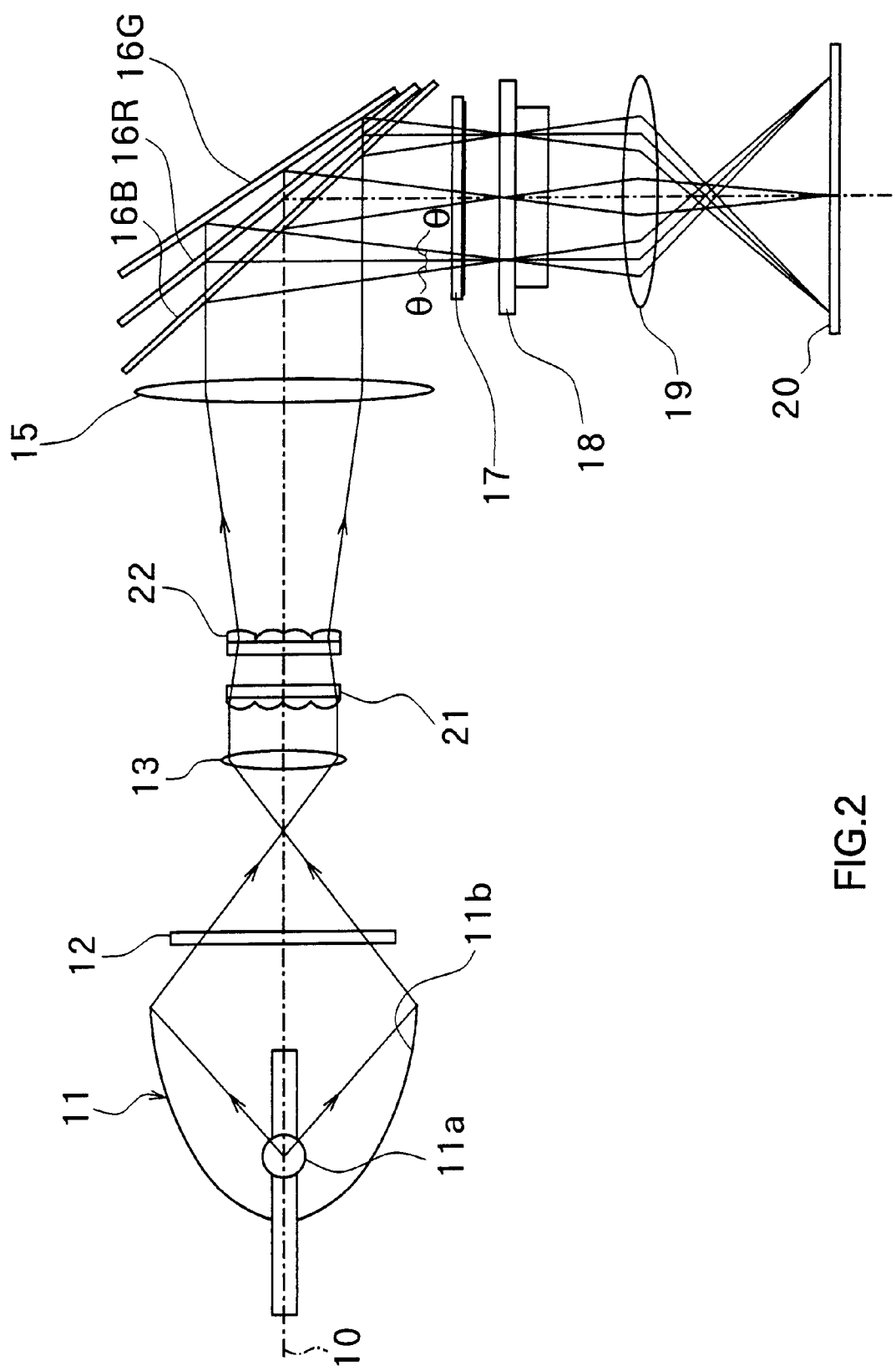
FIG. 2 is a schematic top view of an optical system of a projection-type liquid crystal display apparatus of a first embodiment of the invention.

FIG. 2 is a schematic view of an optical system of a projection-type liquid crystal display apparatus of a first embodiment of the invention, seen from overhead. For simplicity, main light paths are only shown while the other paths are omitted. The apparatus is of the color-filterless single-panel microlens system and comprises: a light source 11 for emitting white light; a UV-IR cut filter 12 for removing ultraviolet and infrared rays from the white light emitted from the light source 11; a collimator lens 13 for transforming the light passing through the UV-IR cut filter 12 and diverging thereafter into a nearly parallel ray bundle; a first lens array 21 made up of a plurality of lens elements arranged in two dimensions for splitting the single nearly parallel ray bundle from the collimator lens 13 into a plurality of split bundles of rays and condensing the bundles; a second lens array 22 made up of a plurality of lens elements corresponding to the lens elements of the first lens array 21 arranged in two dimensions; and a collimator lens 15 for transforming the ray bundle passing through the second lens array 22 into a nearly parallel ray bundle. The first lens array 21 corresponds to a 'first lens array' of the invention. The second lens array 22 corresponds to a 'second lens array' of the invention.

The display apparatus further comprises: dichroic mirrors 16B, 16R and 16G placed in the optical path behind the collimator lens 15 for separating the white ray bundle sent out from collimator lens 15 into color rays of B, R and G and reflecting the color rays at angles different from one another; an incident polarizing plate 17 for transforming the color rays split by the dichroic mirrors 16B, 16R and 16G into light linearly polarized in a specific direction; a liquid crystal panel 18 for performing intensity modulation on the color rays passing through the polarizing plate 17 based on color image signals; and a projection lens 19 for condensing the light sent out from the liquid crystal panel 18 and projecting the light onto a screen 20 and synthesizing the colors. An outgoing polarizing plate placed behind the liquid crystal panel 18 is not shown.

The light source 11 is made up of an emitter 11a and a concave mirror 11b of rotation symmetry. A metal-halide lamp may be used as the emitter 11a. A mirror with excellent condensing efficiency is preferred as the concave mirror 11b such as a spheroid mirror. The first lens array 21 and the second lens array 22 function as integrators for smoothing the illuminance distribution in a surface of the liquid crystal panel 18 by diffusing the white light emitted from the light source. The lens elements of the second lens array 22 send out split bundles of rays incident from the corresponding lens elements of the first lens array 21 so that the split ray bundles are superimposed on each other. The first lens array 21 and the second lens array 22 will be described in detail later on. The dichroic mirrors 16B, 16R and 16G, placed at a small angle from each other, each selectively reflect a ray bundle sent out from the collimator lens 15 and nearly parallel to an optical axis 10 at about 90 degrees and split the ray bundle into three color rays of B, R and G. The dichroic mirrors 16B, 16R and 16G then enter the three color rays into the liquid crystal panel 18 at mutually different angles. In this example, the dichroic mirrors 16B, 16R and 16G are arranged such that the R ray is orthogonally incident to the liquid crystal panel 18 and the B ray and the G ray are each incident on the liquid crystal panel 18 at an angle of [+θ] and [−θ], respectively, from the R ray. Alternatively, the arrangement may be such that the B ray (or the G ray) is orthogonally incident to the liquid crystal panel 18 and the R ray and the G ray (or the R ray and the B ray) are each incident at an angle of [+θ] and [−θ], respectively, from the normal. The dichroic mirrors 16B, 16R and 16G correspond to a 'color split means' of the invention.

The liquid crystal panel 18 is a panel of the color-filterless microlens system, including pixel electrodes (not shown) regularly arranged in two dimensions in correspondence with the colors of R, G and B, and condenser microlenses (not shown) each of which is opposed to every three pixel electrodes of R, G and B with a liquid crystal layer not shown in between. The condenser microlenses each condense rays of three colors B, R and G split by the dichroic mirrors 16B, 16R and 16G and entering at mutually different angles. The condenser microlenses then have the rays each enter the respective pixels corresponding to the three colors of B, R and G. The liquid crystal panel 18 will be described later on.

With respect to the optical elements shown in FIG. 2, the direction orthogonal to the optical axis 10 on the sheet is called horizontal direction and the direction orthogonal to the sheet is called vertical direction. This definition applies to the following description as well.

Figure 3:
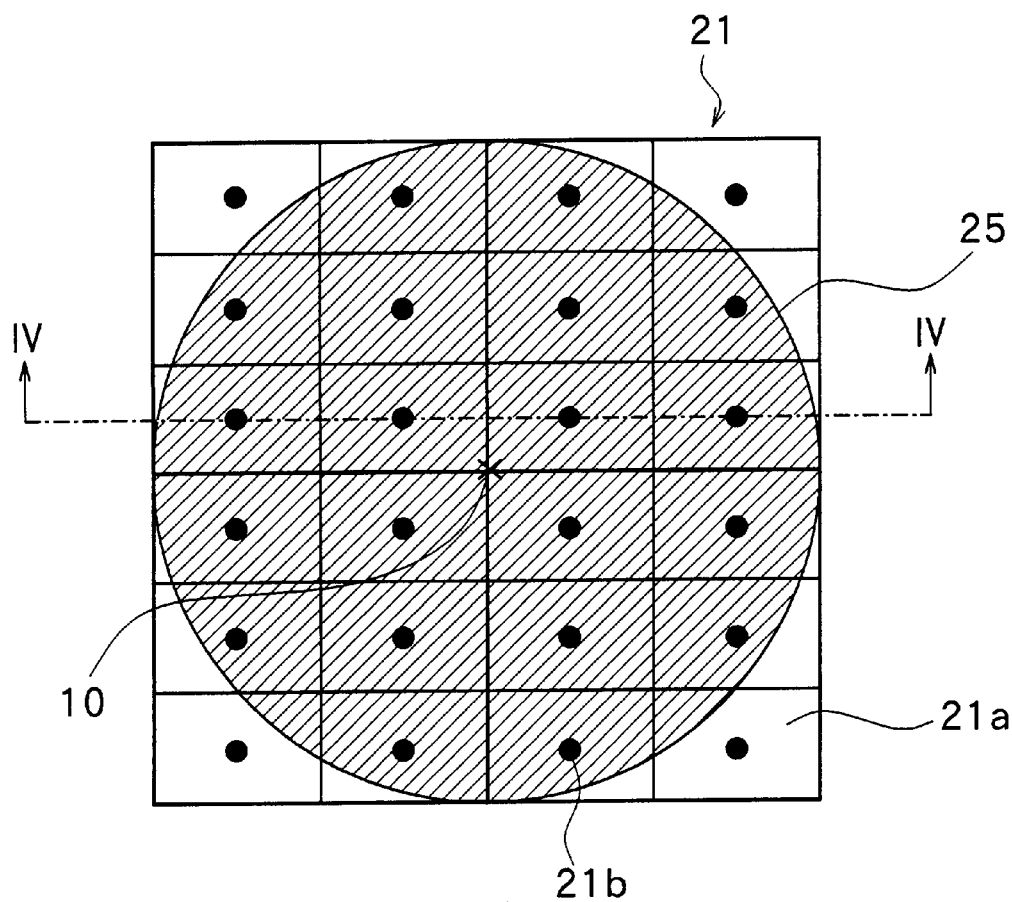
FIG. 3 is a front view of the first lens array shown in FIG. 2.
Figure 4:
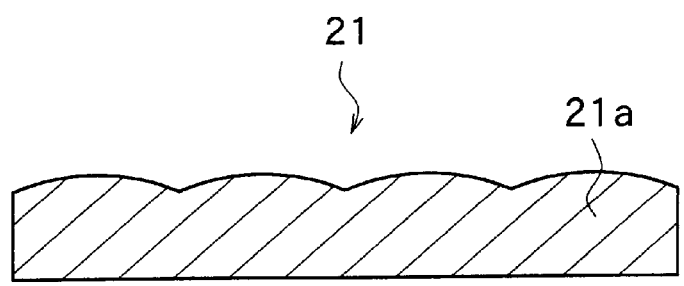
FIG. 4 is a cross section of the first lens array shown in FIG. 2.

FIG. 3 and FIG. 4 illustrates a configuration of the first lens array 21. FIG. 3 is a front view thereof on which light is incident. FIG. 4 is a cross section taken along line IV—IV of FIG. 3. As shown, the first lens array 21 is made up of lens elements 21a in the shape of rectangle of the same size arranged in four columns and in six rows. The lens elements 21a may be made of transparent resin such as polymethyl methacrylate (PMMA) and formed in one piece. One surface of each lens element 21a is flat while the other is a convex spherical surface with a specific curvature. A vertex 21b of each spherical surface is placed in the center of each lens element 21a. As shown in FIG. 2, the first lens array 21 is placed such that light is incident on the spherical surfaces thereof As shown in FIG. 3, the perimeter of the first lens array 21 as a whole is nearly in the shape of square. The first lens array 21 is placed in such a position that a projected image 25 of the light source 11 (to be specific, an image of the emitter 11a and simply called 'light source image' in the following description) is inscribed in the square. The shape of each lens element 21a is nearly geometrically similar to the shape of an effective region of the liquid crystal panel 18. The ratio of the horizontal direction to the vertical direction is 4 to 3, for example. The first lens array 21 is placed in such a position that the optical axis 10 goes through the center thereof and the lens elements 21a are each conjugated with or nearly conjugated with the effective regions of the liquid crystal panel 18.

Figure 5:
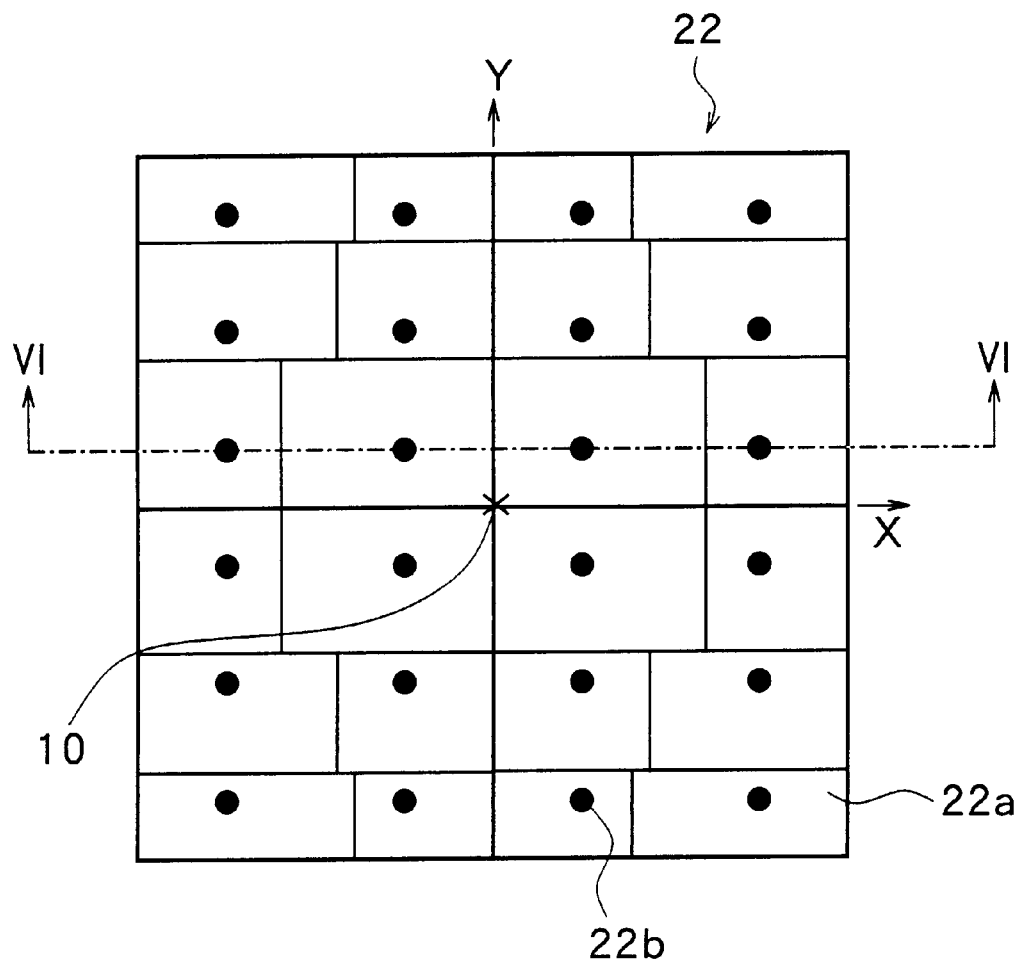
FIG. 5 is a front view of the second lens array shown in FIG. 2.
Figure 6:
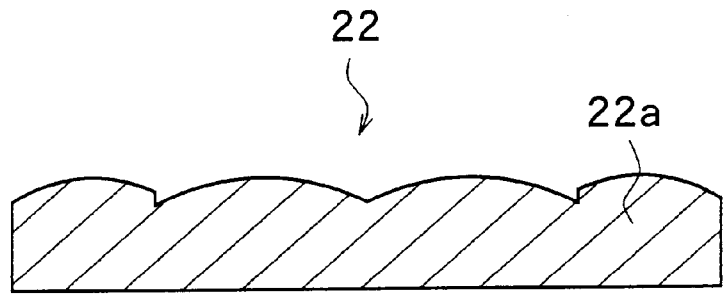
FIG. 6 is a cross section of the second lens array shown in FIG. 2.

FIG. 5 and FIG. 6 illustrate a configuration of the second lens array 22. FIG. 5 is a front view thereof from which light goes out. FIG. 6 is a cross section taken along line VI—VI of FIG. 5. As shown, one surface of each lens element 22a is flat while the other is a convex spherical surface with a specific curvature as the first lens element 21. However, as shown in FIG. 2, the second lens array 22 is placed such that light is incident on the flat surfaces thereof. The lens elements 22a may be made of transparent resin and formed in one piece as the first lens element 21.

As shown in FIG. 5, the perimeter of the second lens array 22 as a whole is the same as that of the first lens array 21 (nearly square). The number of the lens elements 22a is equal to that of the lens elements 21a of the first lens array 21. In contrast to the first lens array 21, the second lens array 22 includes the lens elements 22a whose shape and size are different from one another. In FIG. 5, where the horizontal center borderline is the X axis and the vertical center borderline is the Y axis, the shape and size of the six lens elements 22a belonging to the first quadrant are all different from one another. To be specific, the lens elements 22a become smaller with distance from the center of the second lens array 22. The six lens elements 22a belonging to the second quadrant and the six lens elements 22a belonging to the first quadrant are symmetric with respect to the Y axis. The twelve lens elements 22a belonging to the third and fourth quadrants and the twelve lens elements 22a belonging to the second and first quadrants are symmetric with respect to the X axis. The lens elements 22a correspond to the lens elements 21a of the first lens array 21 (FIG. 3). Small ray bundles sent out from the lens elements 21a each enter nearly the center of the respective lens elements 22a. The reason that the shapes and sizes of the lens elements 22a are different from one another will be described later.

Where the focal length of the lens elements 21a of the first lens array 21 is 'f1' and the focal length of the lens elements 22a of the second lens array 22 is 'f2' (=f1), the lens elements 22a function as field lenses when the lens elements 22a are placed in such a position that the total focal length 'f' of both lens elements is f1 as well.

Figure 8:
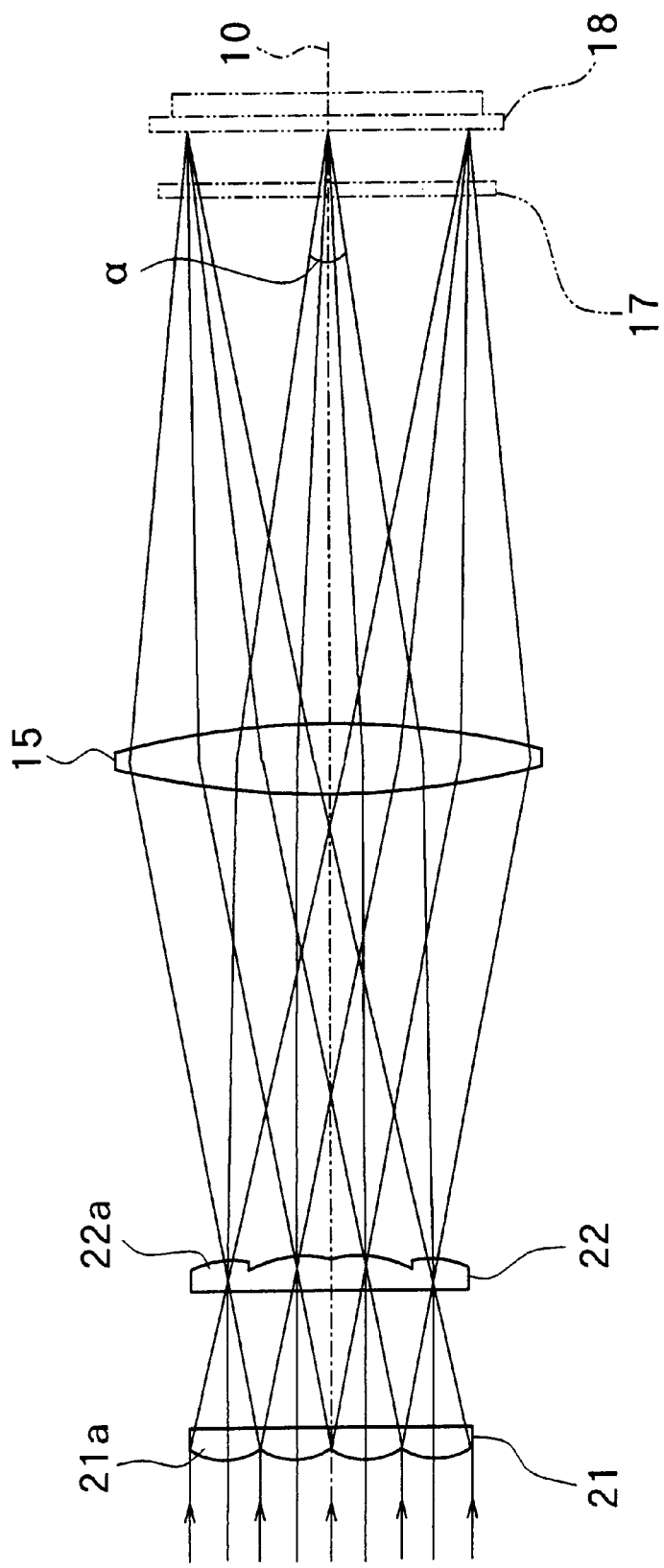
FIG. 8 illustrates the main optical paths of the optical system shown in FIG. 2 in an equivalent manner.

In order to have the lens elements 22a function as field lenses of the corresponding lens elements 21a of the first lens array 21, in addition to the decentered arrangement described above, it is required that the focal point of the lens elements 21a falls on the principal plane of the lens elements 22a. Therefore, as shown in FIG. 8 that will be described later, the principal planes of the corresponding lens elements 22a are placed in such a position that the cross sectional area of the ray bundle condensed by each lens element 21a is minimum.

The second lens array 22 is placed in such a position that the optical axis 10 goes through the center thereof and the lens array 22 as a whole is conjugated with or nearly conjugated with each pixel aperture of the liquid crystal panel 18. The pixel aperture is part of the pixel electrodes not covered with black matrix section 81b shown in FIG. 7 described later. Not only the second lens array 22 functions as field lenses but also the lens array 22 as a whole functions as a diaphragm of ray bundle incident on the liquid crystal panel 18 and thereby regulates incident divergence angle α (FIG. 7) described later. Accordingly, the shape of the second lens array 22 as a whole is nearly similar to that of the aperture of each pixel (pixel electrodes 81B, 81R and 81G shown in FIG. 7 described later) of the liquid crystal panel 18. In the embodiment, as shown in FIG. 5, the perimeter of the whole second lens array 22 is nearly square. The lens array 22 is therefore optimal where the pixel aperture of the liquid crystal panel 18 is nearly square.

Figure 7:
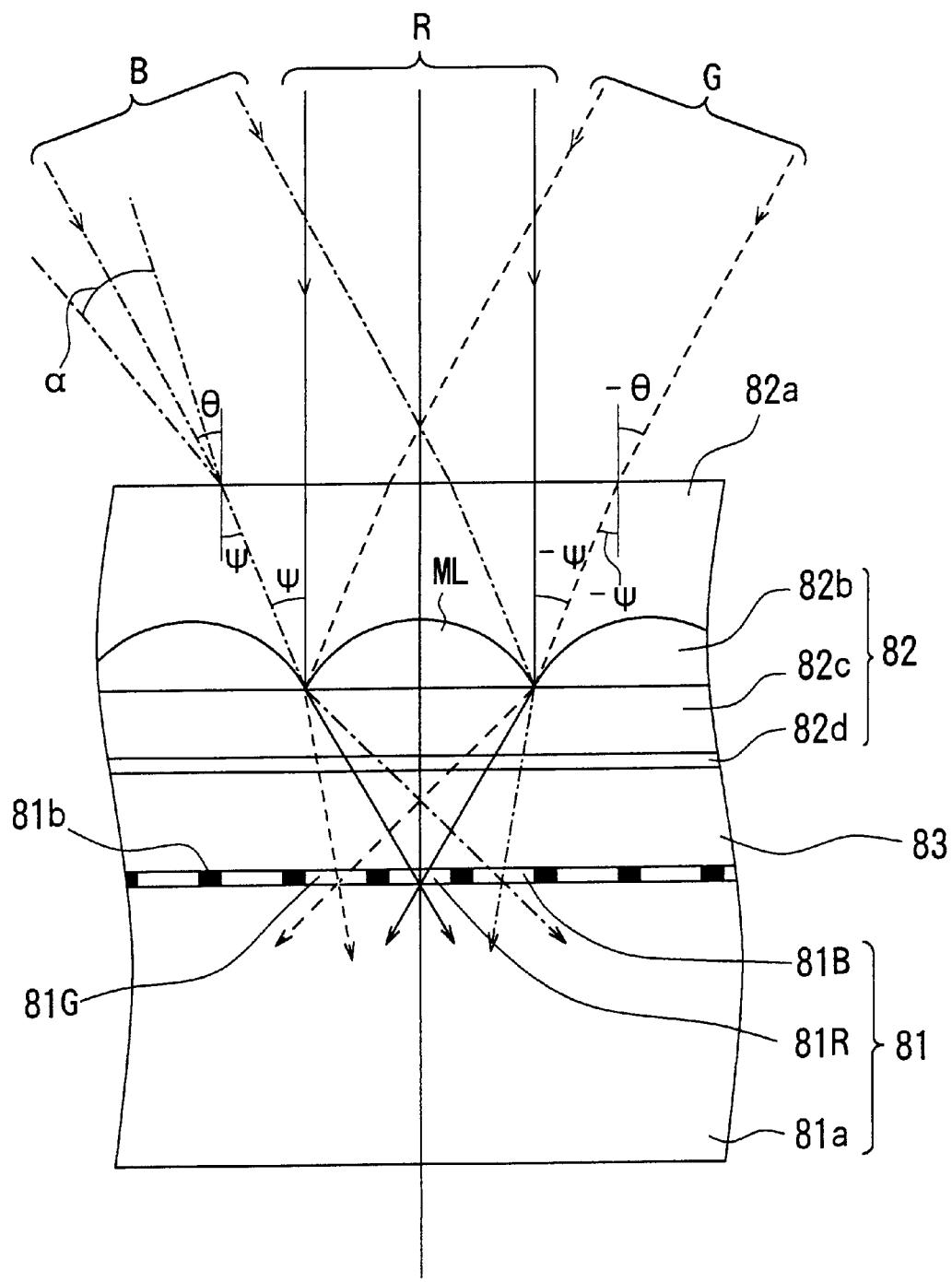
FIG. 7 is a cross section of the main part of the liquid crystal panel shown in FIG. 2.

FIG. 7 is an enlarged cross section of the liquid crystal panel 18 shown in FIG. 2 taken along the horizontal direction. As shown, the liquid crystal panel 18 includes: a pixel substrate 81 where a number of pixel electrodes are formed; a counter substrate 82 where counter electrodes and microlenses are formed; and a liquid crystal layer 83 placed between the pixel electrode 81 and the counter substrate 81.

The pixel substrate 81 includes: a glass substrate 81a; pixel electrodes 81B, 81R, 81G and so on for B, R and G rays, regularly (periodically) arranged on one side (on which light is incident) of the glass substrate 81a; and a black matrix section 81b including TFTs (not shown) functioning as switching devices for applying voltage based on image signals to the pixel electrodes. The TFTs each includes a gate electrode, a drain electrode and a source electrode (not shown) made of poly-silicon, for example. The gate electrode is connected to an address line (not shown) extending from right to left of the sheet. The source electrode is connected to data lines (not shown) for B, R and G extending in the direction orthogonal to the sheet. The drain electrode is connected to the pixel electrodes 81B, 81R and 81G. By selectively applying image signal voltages of B, R and G to the pixel electrodes selected by the address and data lines, the liquid crystal molecular orientation changes in the liquid crystal layer 83 between the pixel electrodes and the counter electrode 82d. The polarization direction of light passing therethrough is thus changed. The black matrix section 81b is shielded from light with a metal film of aluminum and so on not shown so as to prevent the TFTs from wrongly operating.

The counter substrate 82 includes: a glass substrate 82a; a microlens array made up of condenser microlenses 82b formed on one side (from which light goes out) of the glass substrate 82a; a cover glass 82c placed in intimate contact with the microlenses 82b; and a counter electrode 82d formed on the cover glass 82c. The counter electrode 82d is a transparent electrode formed all over the surface of the cover glass 82c or in a required region of the surface of the cover glass 82c (that is, at least in a region opposed to the pixel electrodes 81B, 81R and 81G of the pixel substrate 81). The counter electrode 82d is fixed to a constant potential. The microlenses 82b are formed as gradient index lenses through a method of etching a substrate into the shape of lenses and implanting a transparent resin therein or through selective ion diffusion, for example. The microlenses 82b may be formed through any other method. The microlenses 82b are typically semicylindrical lenses each having an axis orthogonal to the drawing sheet. Alternatively, the microlenses 82b may be formed in the shape of typical sphere, in the shape of nearly spherical curved surface or in the shape of aspherical surface. The liquid crystal panel 18 corresponds to a 'liquid crystal panel' of the invention. The microlenses 82b correspond to 'condensing means' of the invention.

As shown in FIG. 7, one of the microlenses 82b is provided for every three pixel electrodes 81B, 81R and 81G of the pixel electrode 81. The microlense 82b condenses the ray bundles of B, R and G entering from three different directions and have the ray bundles enter the pixel electrodes 81B, 81R and 81G through the liquid crystal layer 83. Attention being focused on the R ray orthogonally incident on the microlens 82b, the focal point of the microlens 82b generally falls above the pixel electrode 81R or the neighborhood thereof If necessary, the focal point may be deep within the glass substrate 81a. The same applies to the other rays (B and G) as well.

Figure 9:
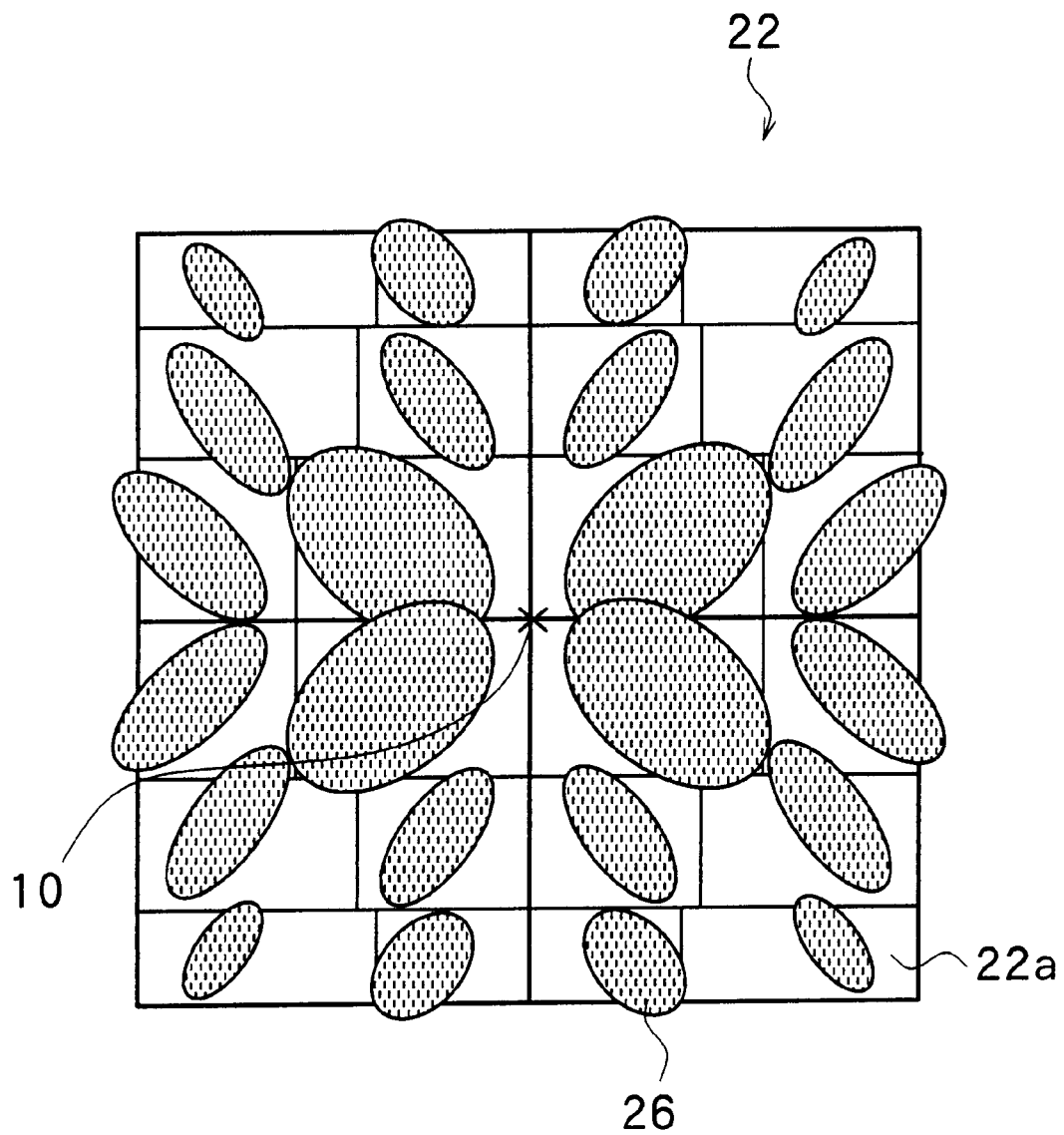
FIG. 9 illustrates light source images projected onto the second lens array shown in FIG. 5.

Referring to FIG. 2, FIG. 8 and FIG. 9, the operation and functions of the projection-type liquid crystal display apparatus with such as configuration will now be described.

Referring to the optical system shown in FIG. 2, the operation of the apparatus as a whole will now be described. As shown, white light is emitted from the light source 11 and ultraviolet and infrared rays are removed from the white light by the UV-IR cut filter 12. The light converges and then diverges and enters the collimator lens 13. The collimator lens 13 transforms the incident light into a single ray bundle nearly parallel to the optical axis 10 and sends out the ray bundle. The single ray bundle enters the first lens array 21 and is divided into a plurality of small-diameter bundles of rays by the lens elements 21a. As shown in FIG. 3, the light source image 25 on the first lens array 21 (that is, the cross section of the incident single ray bundle) is almost completely embraced inside the perimeter of the first lens array 21. The light from the light source is thereby efficiently utilized.

As shown in FIG. 8 that will be described later, the small ray bundles split by the lens elements 21a of the first lens array 21 each converge nearly in the center of the corresponding lens element 22a. The ray bundles then slightly change the direction and diffuse and enter the collimator lens 15. The collimator lens 15 transforms the ray bundles incident from the second lens array 22 into nearly telecentric ray bundles.

The nearly telecentric ray bundles enter the dichroic mirrors 16B, 16R and 16G (FIG. 2). The dichroic mirrors 16B, 16R and 16G split the incident ray bundles into the three colors of B, R and G and reflect the color rays in the directions different from one another. The reflected rays then enter the incident polarizing plate 17 (FIG. 2). The polarizing plate 17 transmits only linearly polarized components in a specific polarization direction of the incident color rays. The sufficiently linearly polarized color rays transmitted through the polarizing plate 17 then enter the microlenses 82b of the liquid crystal panel 18 from the directions different from one another. The liquid crystal panel 18 performs intensity modulation on the color rays of B, R and G based on color image signals and sends out the rays.

Reference is now made to FIG. 7 for describing the path of light incident on microlens ML, one of the microlenses 82b. Since the R ray orthogonally enters the glass substrate 82a, the R ray focuses on the center or the neighborhood of the center of the pixel electrode 81R through which the optical axis of microlens ML passes. The B ray enters the glass substrate 82a at incident angle θ and is refracted at refraction angle φ. The B ray then enters microlens ML at incident angle φ and focuses on the center or the neighborhood of the center of the pixel electrode 81B. The pixel electrode 81B is one of the pixel electrodes neighboring the pixel electrode 81R through which a straight line that passes through the center of microlens ML at angle φ with respect to the optical axis of microlens ML passes. Similarly, the G ray enters the glass substrate 82a at incident angle [−θ] and is refracted at refraction angle φ. The G ray then enters microlens ML at incident angle φ and focuses on the center or the neighborhood of the center of the pixel electrode 81G. The pixel electrode 81G is one of the pixel electrodes neighboring the pixel electrode 81R through which a straight line that passes through the center of microlens ML at angle [−φ] with respect to the optical axis of microlens ML passes. The voltages applied to the pixel electrodes 81B, 81R and 81G change in response to the given pixel signals. Accordingly, the polarizing directions of the color rays of B, R and G passing through the liquid crystal layer 83 are modulated.

The color rays of B, R and G each focusing on the center or near the N center of the respective pixel electrodes 81B, 81R and 81G each go out of the glass substrate 81a while diffusing. The rays are then selectively transmitted through the outgoing polarizing plate not shown and projected onto the screen 20 by the projection lens 19. The colors are thereby synthesized. An color image is thus projected onto the screen 20.

The functions specific to the projection-type liquid crystal display apparatus will now be described.

FIG. 8 briefly illustrates the optical path from the first lens array 21 to the liquid crystal panel 18 shown in FIG. 2. For convenience, in FIG. 8, the deflected optical paths of FIG. 2 are changed into straight paths in an equivalent manner and the dichroic mirrors 16B, 16R and 16G shown in FIG. 2 are omitted. As shown, a plurality of split bundles of rays sent out from the first lens array 21 each have a cross section similar to the perimeter of each lens element 21a. The split bundles of rays finally enter the effective regions of the liquid crystal panel 18 having a shape nearly similar to that of the lens element 21a in a nearly parallel manner (at incident divergence angle α, to be exact). The liquid crystal panel 18 is thereby illuminated with the rays from the light source sent from all the lens elements 21a of the first lens array 21 in a superimposing manner. In this case, the intensity distribution of the single bundle of rays incident on the first lens array 21 is uneven in a cross section orthogonal to the optical axis 10. In contrast, the intensity distribution is relatively even in a cross section of each of the plurality of split bundles of rays into which the single bundle of rays is split by the first lens array 21. Consequently, the illuminance distribution on the liquid crystal panel 18 that is a result of enlarging and superimposing the split bundles of rays is correspondingly even. It is therefore possible to achieve the appropriately even illuminance distribution of the image enlarged and projected onto the screen 20.

As previously described with reference to FIG. 7, the projection-type liquid crystal display apparatus of the color-filterless single-panel microlens system to which the invention is applied performs color image display by entering the three colors of B, R and G to each microlens 82b (FIG. 7) provided in correspondence with the pixel electrodes 81B, 81R and 81G from mutually different directions and entering the light condensed by the microlens 82b to each of the pixel electrodes 81B, 81R and 81G, respectively. If the incident divergence angle α (FIG. 7) of light illuminating the liquid crystal panel 18 is large, one color light (B light, for example) may enter not only the pixel electrode 81B for B color but also the neighboring pixel (the pixel electrode 81R for R or the pixel electrode 81G for G). Color mixture thereby results and the color purity of the displayed image is reduced. The quality of the image may be therefore significantly affected. It is thus required to reduce the incident divergence angle of light incident on the liquid crystal panel 18 to a sufficiently small angle. That is, the limitation on incident divergence angle α at the liquid crystal panel is specifically strict for the apparatus of the color-filterless single-panel microlens system, compared to the apparatuses of other schemes (the single-panel apparatus with color filters and the triple-panel apparatus).

In order to reduce incident divergence angle a of light incident on the liquid crystal panel 18, the perimeter of the second lens array 22 is as small as possible in the embodiment. As previously described, the perimeter of the whole second lens array 22 functions as a diaphragm of the illuminant system as well and therefore defines incident divergence angle α of light incident on the pixels of the liquid crystal panel 18. In order to reduce the size of the second lens array 22, molding with a plastic resin is preferable since the formation by glass pressing used in related-art techniques has a limit of accuracy. For example, the glass pressing requires the size of each lens element 22a to be about 4 mm by 3 mm or above. In contrast, the plastic molding achieves appropriate accuracy with a smaller size.

It is required that limits are placed on incident divergence angle α both in the horizontal and vertical directions. The degree of limits depends on the shape of the pixel aperture. For example, if the shape of the pixel aperture is a rectangle that is long in the vertical direction and narrow in the horizontal direction, the margin of color mixture is narrower in the horizontal direction than in the vertical direction. Color mixture thus often results in the horizontal direction. The limit placed on incident divergence angle α in the horizontal direction is therefore more strict than in the vertical direction. In order to enhance the efficiency of utilizing light to a sufficient level, the limits placed on incident divergence angle α in the horizontal and vertical directions are required to be different from each other. For this reason, the shape of the perimeter of the second lens array 22 is similar to the pixel aperture shape and limitation is thereby imposed on the incident divergence angle in accordance with the ratio of horizontal and vertical lengths of the pixel aperture in the embodiment of the invention. If the pixel aperture is square, for example, the shape of the perimeter of the second lens array 22 may be square as well, as shown in FIG. 5. In this case, the limits placed on incident divergence angle α in the horizontal and vertical directions are equal.

Figure 10:
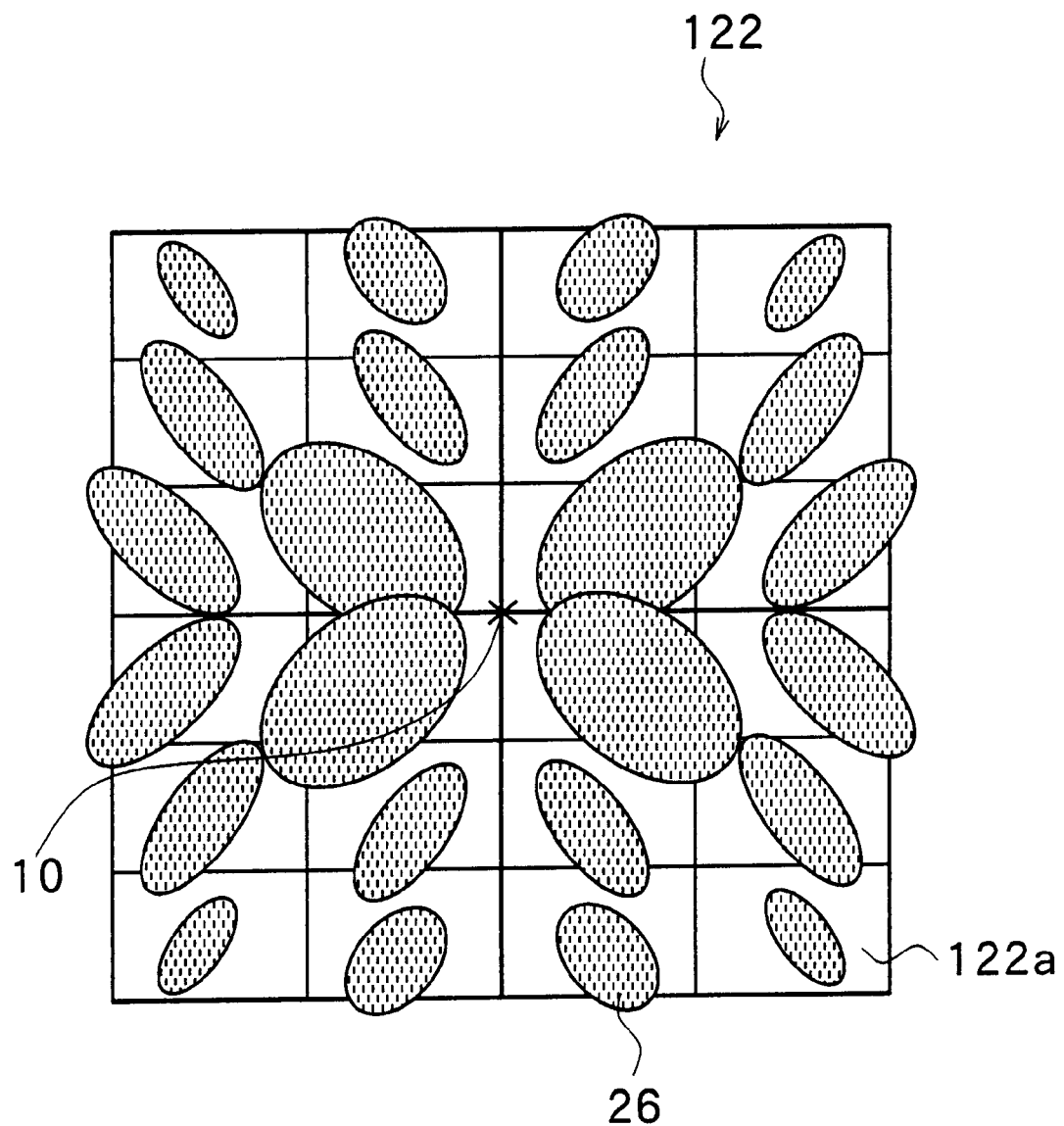
FIG. 10 illustrates light source images projected onto a comparison example of second lens array.

FIG. 9 illustrates the second lens array 22 of the embodiment onto which the light source image 26 is projected. FIG. 10 illustrates an example to be compared with FIG. 9. In contrast to the embodiment, FIG. 10 shows the example where a second lens array 122 is made up of lens elements 122a each of which is equal to the lens element 21a (FIG. 3) of the first lens array 21 in size and shape. The light source images 26 shown are generated from split bundles of rays sent out from the lens elements 21a of the first lens array 21. The first lens array opposing to the second lens array 122 is the same as the one shown in FIG. 3.

As shown in FIG. 10, the light source images 26 incident on the lens elements 122a close to the center of the second lens array 122 through which the optical axis 10 goes are relatively large. The light source images 26 incident on the lens elements 122a away from the optical axis 10 are relatively small. The center of each light source image 26 does not necessarily correspond to the center of the corresponding lens element 122a. In addition, the lens elements 122a are all equal in size and shape. Consequently, the relatively large portion of the light source image is projected onto the neighboring lens element 122a out of the corresponding lens element 122a. In this case, the portion of light off the corresponding lens element 122a does not go through the proper optical path as shown in FIG. 8 and does not reach the liquid crystal panel 18 and contribute to illumination of the liquid crystal panel 18. That is, a loss in light quantity increases and the efficiency of utilizing light decreases. Therefore, if the portions of the light source images off the lens elements 122a are too large, the illuminance on the liquid crystal panel 18 is insufficient and the luminance of the image displayed on the screen 20 is thereby reduced.

In contrast, as shown in FIG. 9, the shapes and sizes of the lens elements 22a are appropriately varied from one another in accordance with the shapes and sizes of the light source images 26 in the second lens array 22 of the embodiment. The light source images 26 therefore almost fall within the perimeter of the respective lens elements 22a of the second lens array 22. In particular, the large light source images 26 near the center fall within the respective lens elements 22a almost completely. Although some of the other light source images 26 extend off the corresponding lens elements 22a, the portions are not so large. As a result, the loss in light quantity of the second lens array 22 is smaller than that of the comparison example shown in FIG. 10. A reduction in illuminance of the liquid crystal panel 18 is thereby prevented. That is, the efficiency of utilizing light is enhanced.

Determination of the size of the second lens array 22 and the focal length of the lens elements 21a of the first lens array 21 will now be described.

In FIG. 8, each lens element 21a of the first lens array 21 is conjugated with or nearly conjugated with the surface of the liquid crystal panel 18. Enlargement ratio m is nearly given by expression (1) below.

$$m = f3/f1 \qquad (1)$$

where f1 is the focal length of each lens element 21a of the first lens array 21 and f3 is the focal length of the collimator lens 15.

The size of each lens element 21a of the first lens array 21 and the size of the liquid crystal panel 18 being given, enlargement ratio m is determined. Therefore, focal length f3 of the collimator lens 15 being given, focal length f1 of the lens element 21a of the first lens array 21 is given by f3/m from expression (1).

The position of the principal plane of the second lens array 22 is the diaphragm position of light incident on the liquid crystal panel 18. The shape of the perimeter of the second lens array 22 is conjugated with or nearly conjugated with the pixel aperture of the liquid crystal panel 18 with respect to the collimator lens 15 and the microlens 82b. Reduction ratio m' of the shape of perimeter of the second lens array 22 with respect to the pixel aperture of the liquid crystal panel 18 is nearly given by expression (2) below.

$$m' = f4/f3 \qquad (2)$$

where f4 is the focal length of the microlens 82b.

Expression (3) below is given where the size of the pixel aperture of the liquid crystal panel 18 is d and the size of the whole second lens array 22 is D.

$$m' = d/D \qquad (3)$$

Reduction ratio m' is determined by expression (2) if focal length f3 of the collimator lens 15 and focal length f4 of the microlens 82b are given. Consequently, size D of the second lens array 22 is determined by d/m' from expression (3) if size d of the pixel aperture of the liquid crystal panel 18 is given.

The size of the second lens element 22 is theoretically set to any value as long as expression (2) is satisfied. It is therefore possible to increase the size of the second lens element 22 by setting reduction ratio m' to a value as small as possible. However, this is not realistic since focal length f3 of the collimator lens 15 is required to be considerably increased and the length of the apparatus is thereby required to be increased. Therefore, in order to reduce the size of the apparatus, it is preferable to reduce the size of the second lens array 22 as much as possible and to set reduction ratio m' to as close as '1'.

According to the embodiment of the invention described so far, a plurality of split bundles of rays sent out from the first lens array 21 each have a cross section similar to the perimeter of each lens element 21a. The split bundles of rays enter the effective regions of the liquid crystal panel 18 having a shape nearly similar to that of the lens element 21a. The liquid crystal panel 18 is thereby illuminated with the rays from the light source sent from all the lens elements 21a of the first lens array 21 in a superimposing manner without wasting light. In this case, the intensity distribution of the single bundle of rays incident on the first lens array 21 is uneven in a cross section orthogonal to the optical axis 10. In contrast, the intensity distribution is relatively even in a cross section of each of the plurality of split bundles of rays into which the single bundle of rays is split by the first lens array 21. Consequently, the illuminance distribution on the liquid crystal panel 18 that is a result of superimposing the split bundles of rays is correspondingly even. It is therefore possible to achieve the appropriately even illuminance distribution of the image enlarged and projected onto the screen 20.

Figure 11:
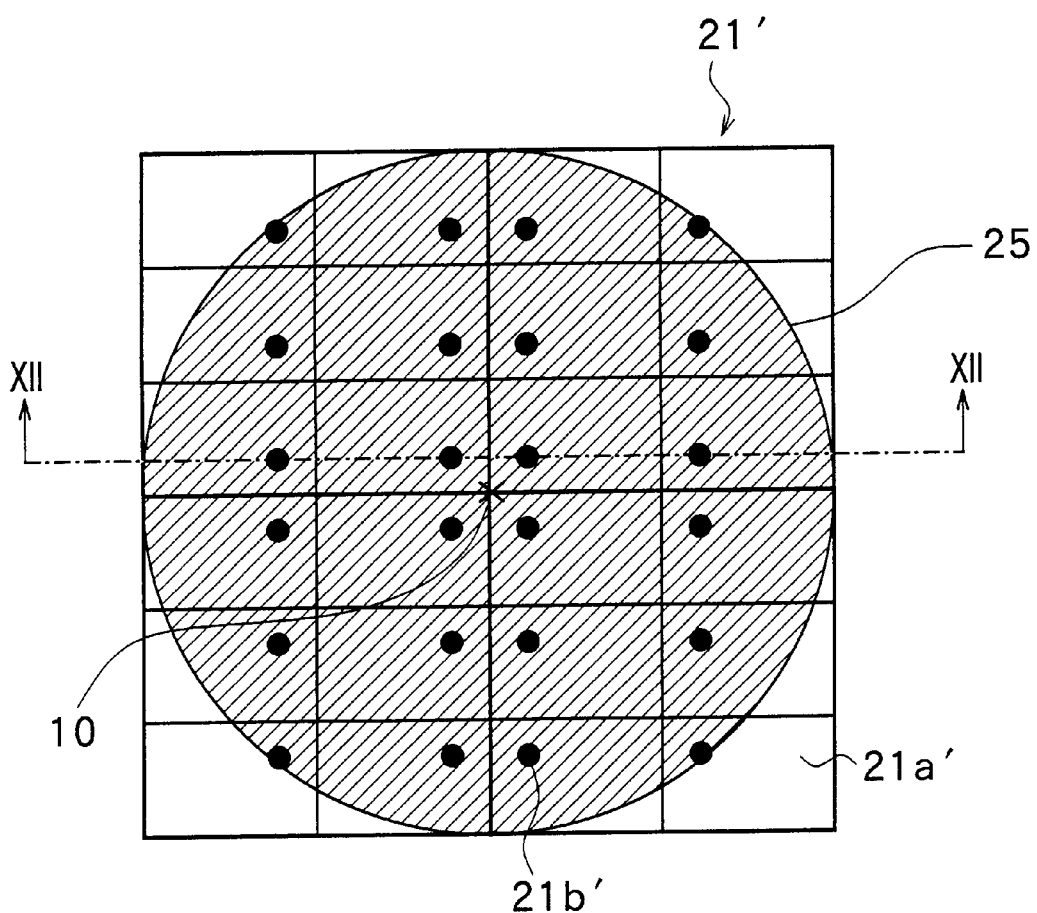
FIG. 11 is a front view of a modification example of the first lens array of the first embodiment.
Figure 12:
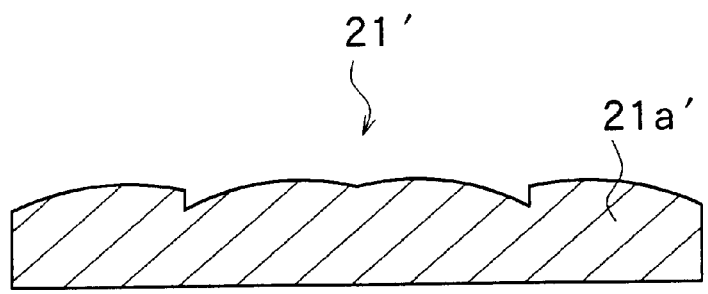
FIG. 12 is a cross section of the modification example of the first lens array of the first embodiment.

In the embodiment, the vertex 21b of each sphere of the lens array 21 is placed in the center of each lens element 21a and not decentered as shown in FIG. 3. Alternatively, a vertex 21b' of each sphere is placed off the center of each lens element 21a' as shown in FIG. 11 and FIG. 12. FIG. 11 is a front view on which light is incident. FIG. 12 is a cross section taken along line XII—XII of FIG. 11. In this variation, each lens element 21a' is decentered so that the vertex 21b' of each sphere is closer to the optical axis 10. As a result, split bundles of rays split by the lens elements 21a' of the first lens element 21' move towards the optical axis 10. Consequently, the light source images 26 gather around the center of the second lens array and the diaphragm aperture is thereby substantially reduced. The incident divergence angle on the liquid crystal panel 18 is thereby limited to a small angle. In addition, the portions of the ray bundles off the second lens array 22 are reduced as well. A loss in light quantity of the second lens array 22 is thus reduced.

[Second Embodiment]

A second embodiment of the invention will now be described.

Additional description on the function of the first embodiment as an example to be compared with the second embodiment will now be given. In the foregoing first embodiment, the first lens array 21 and the second lens array 22 as a whole are equal to each other in size and shape. In addition, no lens element 21a of the first lens array 21 is decentered as shown in FIG. 3. Therefore, as shown in FIG. 9, there is significant space among the light source images 26 on the second lens array 22, that is, the lens elements 22a include unnecessary space. The same applies to the comparison example shown in FIG. 10. This means that the size of the second lens array 22 (or 122) is more than necessary.

If reduction is required in the size of the pixel aperture of the liquid crystal panel 18 in order to achieve higher definition, for example, the whole size of the second lens array 22 is required to be reduced so as to reduce incident divergence angle α of light incident on the liquid crystal panel 18. Accordingly, the whole size of the corresponding first lens array 21 is required to be reduced as well. Otherwise, the light source images 26 on the second lens array 22 significantly extend off the respective lens elements 22a and the efficiency of utilizing light is reduced. However, if the whole size of the first lens array 21 is reduced, it is difficult to receive all the light from the light source 11 with the first lens array 21. As a result, the efficiency of utilizing light is reduced and the illuminance on the liquid crystal panel 18 is reduced.

The quantity of light reaching the liquid crystal panel 18 by means of the second lens array 22 is inevitably reduced if incident divergence angle α of light incident on the liquid crystal panel 18 is reduced by simply reducing the size of the perimeter of the second lens array. The illuminance on the liquid crystal panel 18 is thus reduced as well.

A projection-type liquid crystal display apparatus of the second embodiment is provided for increasing light quantity. The apparatus of the second embodiment is the apparatus of the first embodiment to which some modifications are made. The apparatus will now be described, referring to FIG. 13 to FIG. 19. Like numerals are assigned to components similar to those of the first embodiment and descriptions thereof are omitted if appropriate.

Figure 13:
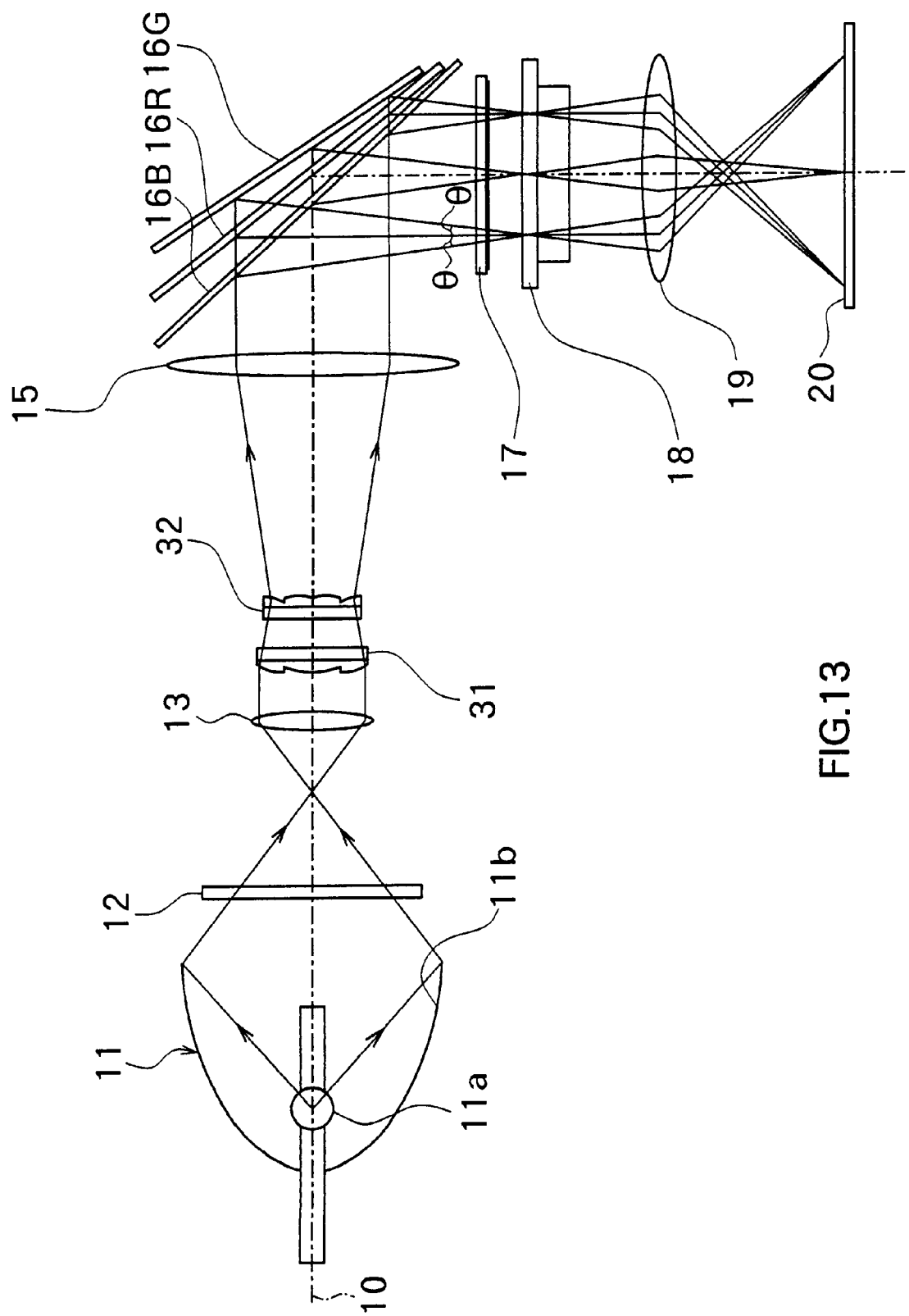
FIG. 13 is a schematic top view of an optical system of a projection-type liquid crystal display apparatus of a second embodiment of the invention.

FIG. 13 is a schematic view of an optical system of the projection-type liquid crystal display apparatus of the second embodiment of the invention, seen from overhead. The apparatus is similar to the apparatus of the first embodiment of the color-filterless single-panel microlens system except that the apparatus of the second embodiment comprises a first lens array 31 and a second lens array 32 instead of the first lens array 21 and the second lens array 22 shown in FIG. 2. The first lens array 31 corresponds to the 'first lens array' of the invention. The second lens array 32 corresponds to the 'second lens array' of the invention. The first lens array 31 and the second lens array 32 will now be described in detail.

Figure 14:
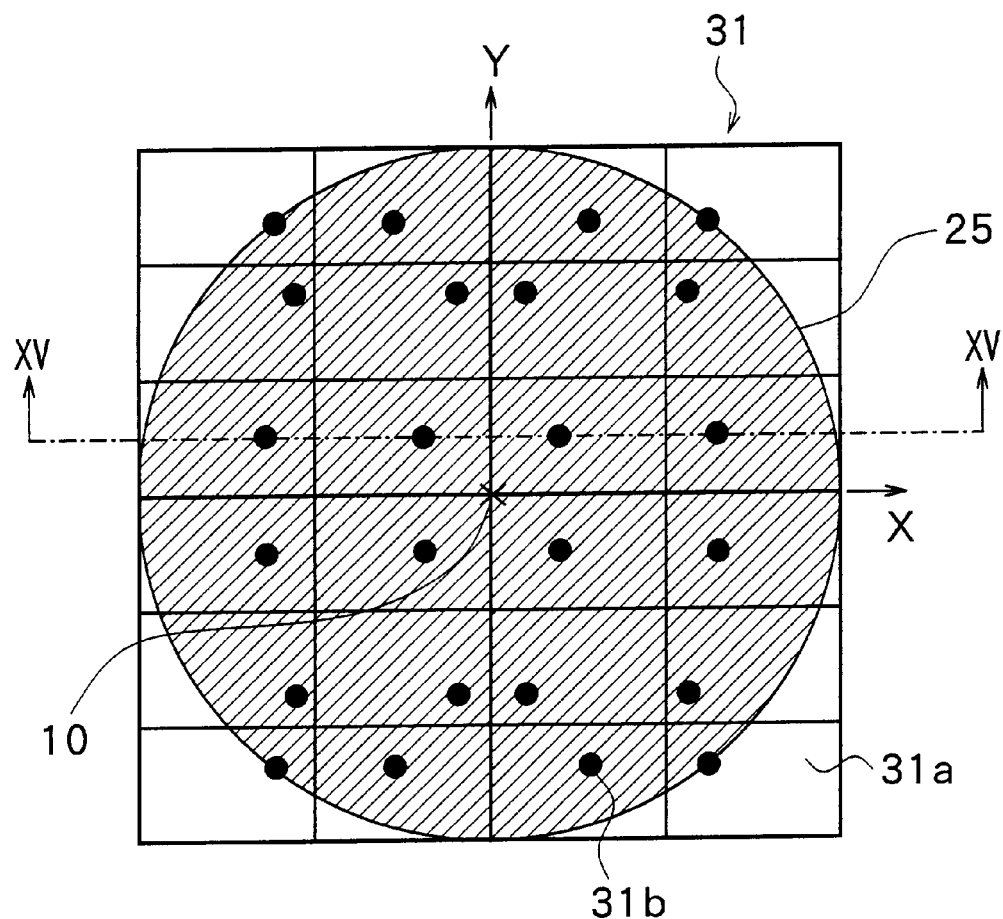
FIG. 14 is a front view of the first lens array shown in FIG. 13.
Figure 15:
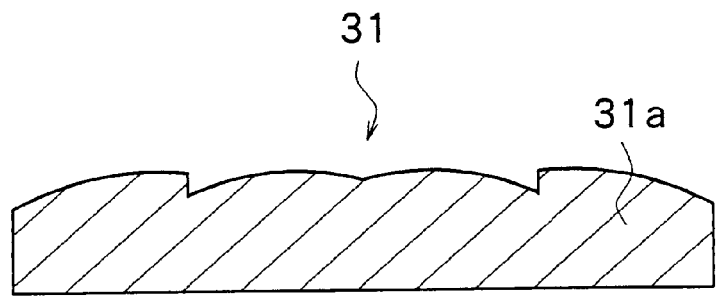
FIG. 15 is a cross section of the first lens array shown in FIG. 13.

FIG. 14 and FIG. 15 illustrates a configuration of the first lens array 31 shown in FIG. 13. FIG. 14 is a front view thereof on which light is incident. FIG. 15 is a cross section taken along line XV–XV of FIG. 14. As shown, the first lens array 31 is made up of lens elements 31a equal to one another in shape and size, arranged in four columns and in six rows. One surface of each lens element 31a is flat while the other is a convex spherical surface with a specific curvature. A vertex 31b of each spherical surface is shifted from the center of each lens element 31a in a specific direction by a specific amount. The vertex 31b is thus decentered with respect to the perimeter of each lens element 31a. As shown in FIG. 13, the first lens array 31 is placed such that light is incident on the convex spherical surfaces thereof.

As shown in FIG. 14, where the horizontal center borderline is the X axis and the vertical center borderline is the Y axis, the directions and amounts of decentering of the six lens elements 31a belonging to the first quadrant are all different from one another. The six lens elements 31a belonging to the second quadrant and the six lens elements 31a belonging to the first quadrant are symmetric with respect to the Y axis. The twelve lens elements 31a belonging to the third and fourth quadrants and the twelve lens elements 31a belonging to the second and first quadrants are symmetric with respect to the X axis.

The perimeter of the first lens array 31 as a whole is nearly square. The first lens array 31 is placed in such a position that the light source image 25 of the light source 11 is inscribed in the square. The shape of each lens element 31a is nearly geometrically similar to the shape of the effective region of the liquid crystal panel 18. The ratio of the horizontal direction to the vertical direction is 4 to 3, for example. The first lens array 31 is placed in such a position that the lens elements 31a are each conjugated with or nearly conjugated with the effective regions of the liquid crystal panel 18.

Figure 16:
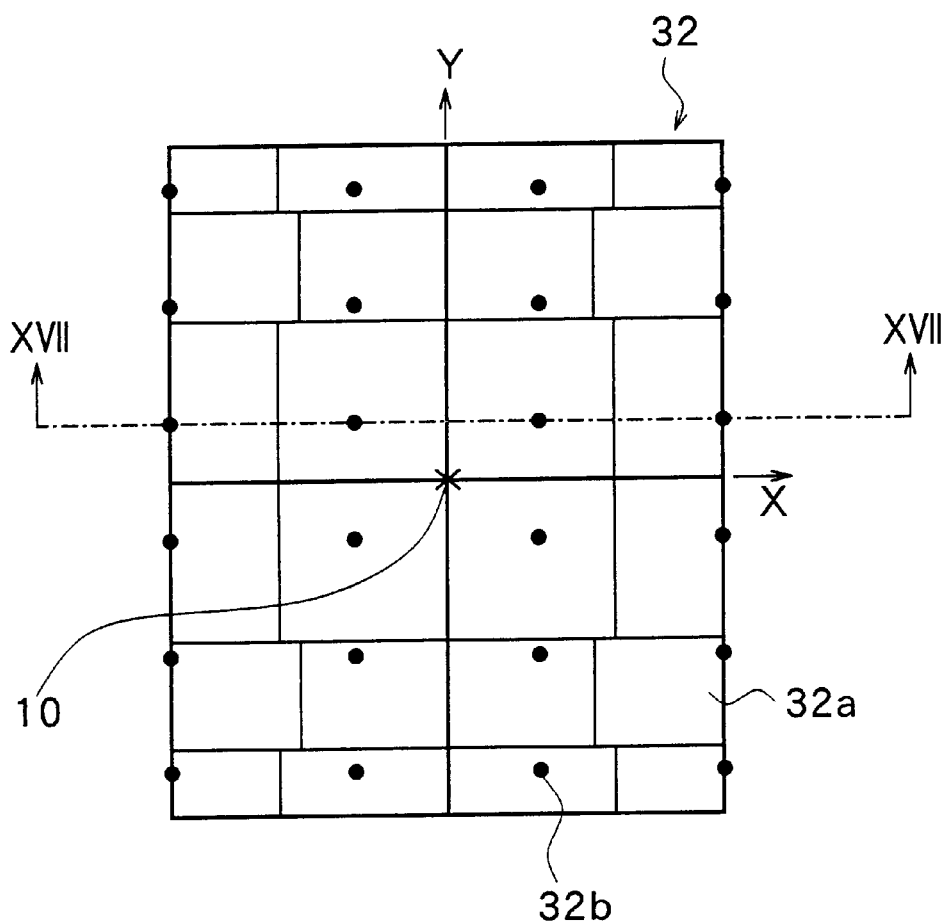
FIG. 16 is a front view of the second lens array shown in FIG. 13.
Figure 17:
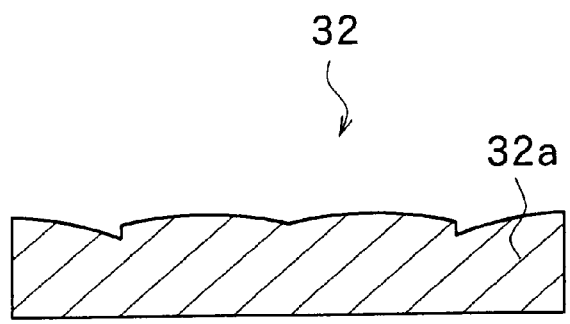
FIG. 17 is a cross section of the second lens array shown in FIG. 13.

FIG. 16 and FIG. 17 illustrates a configuration of the second lens array 32. FIG. 16 is a front view thereof from which light goes out. FIG. 17 is a cross section taken along line XVII—XVII of FIG. 16. The second lens array 32 includes lens elements 32a different from one another in size and shape. One surface of each lens element 32a is flat while the other is a convex spherical surface with a specific curvature as the first lens element 31.

As shown in FIG. 16, where the horizontal center borderline is the X axis and the vertical center borderline is the Y axis, the shapes and sizes of the six lens elements 32a belonging to the first quadrant are all different from one another. To be specific, the lens elements 32a become smaller with distance from the center of the second lens array 32 (the intersection point of the X and Y axes). The vertex 32b of the spherical surface of each lens element 32a is shifted from the center of each lens element 32a in a specific direction by a specific amount. The vertex 32b is thus decentered with respect to the perimeter of each lens element 32a. The six lens elements 32a belonging to the second quadrant and the six lens elements 32a belonging to the first quadrant are symmetric with respect to the Y axis. The twelve lens elements 32a belonging to the third and fourth quadrants and the twelve lens elements 32a belonging to the second and first quadrants are symmetric with respect to the X axis. Each vertex 32b of the sphere from which light is sent out of each lens element 32a of the second lens array 32 is positioned along a straight line passing through the center of the corresponding lens element 31a and parallel to the optical axis 10. Therefore, each lens element 32a is off the center of the perimeter in a specific direction.

Figure 18:
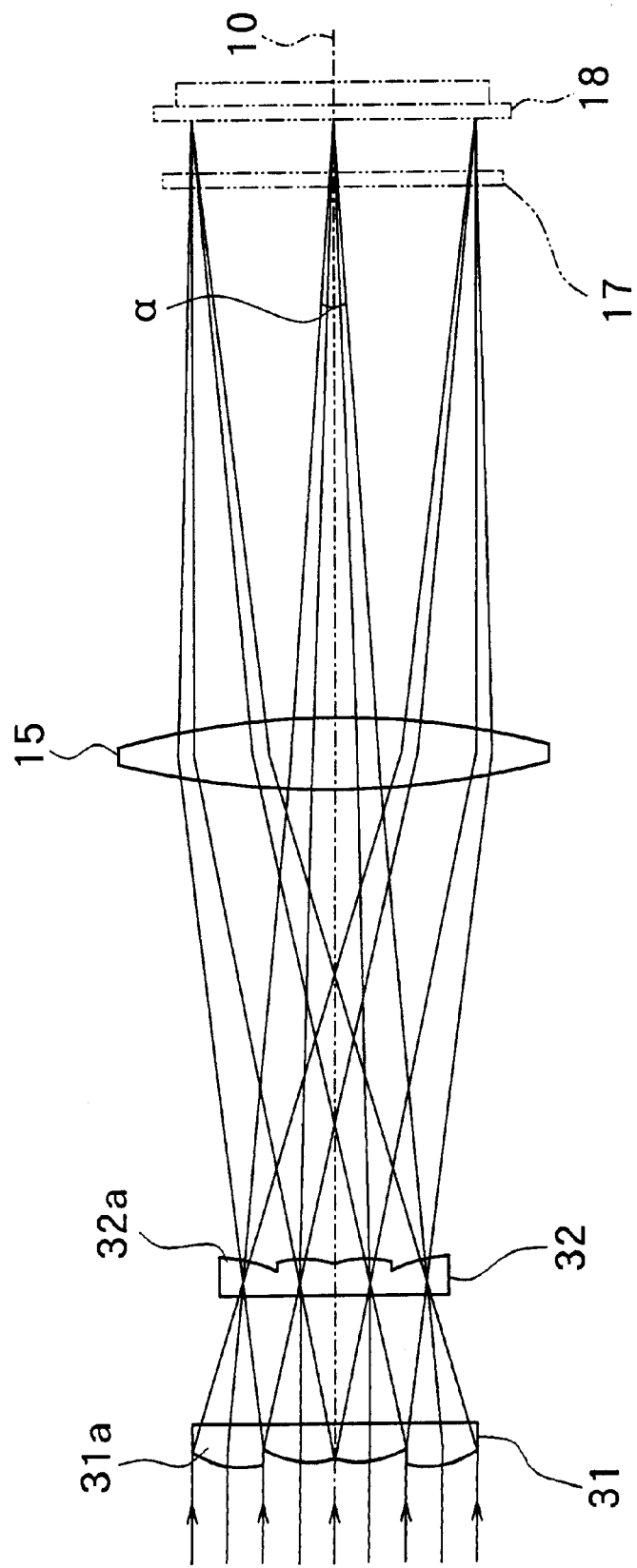
FIG. 18 illustrates the main optical paths of the optical system shown in FIG. 13 in an equivalent manner.

As in the first lens array 31, the total number of the lens elements 32a is 24, that is, four columns and six rows. In contrast to the first embodiment (FIG. 5), the shape of the whole second lens array 32 is a rectangle slightly long in the vertical direction. This is because the shape of the second lens array 32 is made similar to that of the pixel aperture that is slightly long in the vertical direction used for achieving higher definition of the liquid crystal panel 18. The lens elements 32a of the second lens array 32 correspond to the lens elements 31a of the first lens array 31. As shown in FIG. 18 that will be described later, ray bundles sent out from the lens elements 31a each enter nearly the center of the respective lens elements 32a.

As shown in FIG. 14, each lens element 31a of the first lens array 31 is decentered so that every split bundle of rays passing through each lens element 31a converges in the center of the corresponding lens element 32a of the second lens array 32. As shown in FIG. 16, each lens element 32a of the second lens array 32 is decentered so that the lens element 32a functions as a field lens. Every split bundle of rays sent from each lens element 32a is thereby almost precisely superimposed on the liquid crystal panel 18 and enlarged and projected. In order to have the lens elements 32a function as field lenses of the corresponding lens elements 31a of the first lens array 31, in addition to the decentered arrangement described above, it is required that the focal point of the lens elements 31a falls on the principal plane of the lens elements 32a. To be specific, as shown in FIG. 18 that will be described later, the principal planes of the corresponding lens elements 32a are each placed in such a position that the cross sectional area of the ray bundle condensed by each lens element 31a is minimum.

The second lens array 32 is conjugated with or nearly conjugated with each pixel aperture of the liquid crystal panel 18. Not only the second lens array 32 functions as field lenses but also the lens array 32 as a whole functions as a diaphragm of a ray bundle incident on the liquid crystal panel 18 and regulates incident divergence angle $\alpha$. Accordingly, the shape of the second lens array 32 as a whole is nearly similar to that of the aperture of each pixel of the liquid crystal panel 18. In order to reduce the apparatus size, the size of the second lens array 32 is minimized and reduction ratio m' given by expression (2) is as close to '1' as possible (that is, the reduction ratio is as small as possible). These points are similar to the foregoing first embodiment.

The functions of the projection-type liquid crystal display apparatus of the second embodiment will now be described. The functions specific to the embodiment will be only described while the basic function of the optical system as a whole shown in FIG. 13 that is similar to that of the first embodiment will be omitted.

FIG. 18 briefly illustrates the optical path from the first lens array 31 to the liquid crystal panel 18 shown in FIG. 13. FIG. 18 corresponds to FIG. 8 of the foregoing first embodiment. In FIG. 18, for convenience, the deflected optical paths of FIG. 13 are changed into straight paths in an equivalent manner and the dichroic mirrors 16B, 16R and 16G shown in FIG. 13 are omitted.

As shown, a plurality of bundles of rays sent out from the first lens array 31 each have a cross section similar to the periphery of each lens element 31a. The bundles of rays enter the effective regions of the liquid crystal panel 18 having a shape nearly similar to that of the lens element 31a. The liquid crystal panel 18 is thereby illuminated with the rays from the light source sent from all the lens elements 31a of the first lens array 31 in a superimposing manner. In this case, the intensity distribution of the single bundle of rays incident on the first lens array 31 is uneven in a cross section orthogonal to the optical axis 10. In contrast, the intensity distribution is relatively even in a cross section of each of the plurality of split bundles of rays into which the single bundle of rays is split by the first lens array 31. Consequently, the illuminance distribution on the liquid crystal panel 18 that is a result of superimposing the split bundles of rays is correspondingly even. It is therefore possible to achieve the appropriately even illuminance distribution of the image enlarged and projected onto the screen 20. This feature is similar to that of the first embodiment.

As previously described, the projection-type liquid crystal display apparatus of the color-filterless single-panel microlens system requires incident divergence angle $\alpha$ of light incident on the liquid crystal panel 18 to be reduced to a sufficiently small angle. In the embodiment, the perimeter of the second lens array 32 is therefore made as small as possible. The perimeter of the second lens array 32 functions as a diaphragm of the illuminant system as well. Incident divergence angle $\alpha$ of light incident on the pixels of the liquid crystal panel 18 is thereby defined. This feature is similar to that of the first embodiment as well.

As previously described, it is required that limits are placed on incident divergence angle $\alpha$ both in the horizontal and vertical directions. The degree of limits depends on the shape of the pixel aperture. For example, if the shape of the pixel aperture is a rectangle that is long in the vertical direction for achieving higher definition, the shape of the perimeter of the second lens array 32 is required to be a rectangle similar to the pixel aperture. In the embodiment, as shown in FIG. 16, the perimeter of the lens elements 32a of the second lens array 32 is a rectangle similar to the pixel aperture of the liquid crystal panel 18. In this case, a limit imposed on incident divergence angle $\alpha$ is more strict in the horizontal direction than in the vertical direction. In accordance with the limit, the horizontal length of the second lens array 32 is reduced and the diaphragming amount in the horizontal direction is increased. Color mixture is thereby effectively prevented not only in the horizontal direction but also in the vertical direction. If the pixel aperture is reduced not only in the horizontal direction but also in the vertical direction, the vertical length of the second lens array 32 may be reduced, accordingly.

However, if the size of the first lens array 32 is reduced as well in accordance with the perimeter of the second lens array 32, the quantity of light reaching the liquid crystal panel 18 is inevitably limited and the illuminance on the liquid crystal panel 18 is reduced.

Therefore in the embodiment, as shown in FIG. 14, the shape of the whole first lens array 31 is as close to circle or square as possible. In addition, the whole size of the first lens array 31 is as large as possible so that the light source image 25 on the first lens array 31 (that is, the cross section of the incident single ray bundle) is almost completely embraced inside the perimeter of the whole first lens array 31 (that is, the ray bundle is received as much as possible from the light source 11). A loss in light quantity due to vignetting (eclipses) on the first lens array 31 is thereby minimized.

Figure 19:
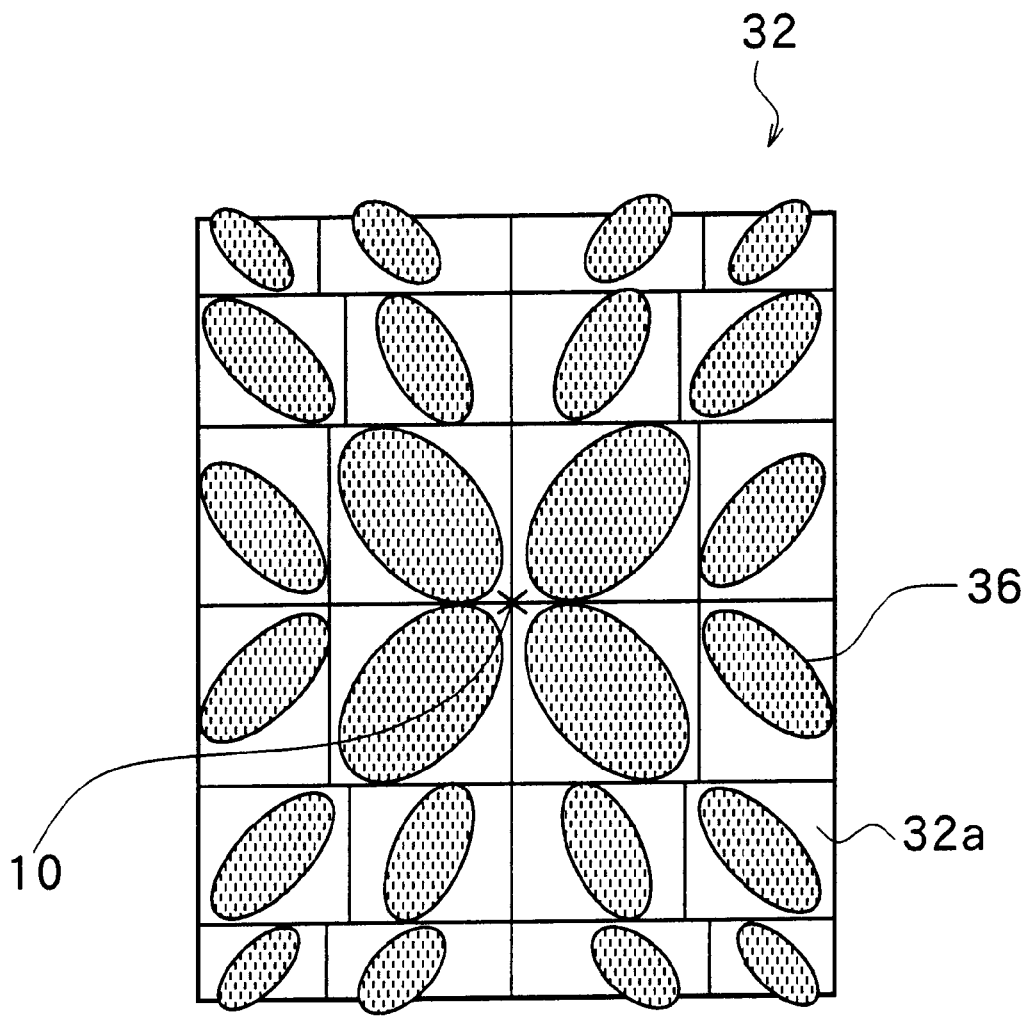
FIG. 19 illustrates light source images projected onto the second lens array shown in FIG. 16.

In the embodiment, each lens element 31a of the first lens array 31 is appropriately decentered so that the mutual distance among split ray bundles sent out from the first lens array 31 is minimized. As a result, the split ray bundles passing through the lens elements 31a of the first lens array 31 and reaching the second lens array 32 are prevented from falling off the respective lens elements 32a of the second lens array 32 whose overall size is smaller than that of the first lens array 31. Furthermore, the position and size of the second lens array 32 are determined in accordance with the reaching point and size of the split ray bundles thus determined. Consequently, as shown in FIG. 19, the distances among the centers of the lens elements 32a are sufficiently small without waste. Each light source image 36 of the lens element 31a of the first lens array 31 is almost precisely projected onto the center of the corresponding lens element 32a of the second lens array 32 without falling off the lens element 32a.

FIG. 19 illustrates the light source images on the second lens array 32 on which light is incident. As shown, the light source images 36 incident on the lens elements 32a close to the optical axis 10 (the center of the second lens array 32) are relatively large. The light source images 36 incident on the lens elements 32a away from the optical axis 10 are relatively small. It is noted that the sizes and shapes of the lens elements 32a are optimized accordingly. That is, in contrast to FIG. 9, wasted space where no light source image 36 sent by the split ray bundle is applied is reduced in the lens elements 32a. There are few light source images 36 extending off the lens elements 32a as well. This means that the overall size of the second lens array 32 is effectively reduced. That is, the second lens array 32 as a diaphragm is reduced so that incident divergence angle α on the liquid crystal panel 18 is limited to a sufficiently small angle.

According to the projection-type liquid crystal display apparatus of the second embodiment of the invention described so far, the size of the perimeter of the first lens array 31 is as large as possible so that the single ray bundle from the light source is almost all received. In addition, the lens elements 31a are each decentered so that the split ray bundles split and sent out by the first lens array 31 come as close to the optical axis 10 as possible. Furthermore, the sizes, shapes and positions of the respective lens elements 32a of the second lens array 32 are determined in accordance with the reaching points of the split ray bundles. As a result, a loss in light quantity due to vignetting caused by the first lens array 31 is reduced. In addition, a loss in light quantity in the second lens array 32 is sufficiently decreased while the second lens array 32 is sufficiently reduced. The efficiency of utilizing light is thereby enhanced in the optical illumination system as a whole. Since a reduction in the second lens array 32 as a diaphragm is allowed, incident divergence angle α of light incident on the liquid crystal panel 18 is sufficiently reduced. Color mixture on the liquid crystal panel 18 is thus effectively reduced. As in the foregoing first embodiment, the surface of the liquid crystal panel 18 is illuminated by light passing through the lens elements 31a of the first lens array 31 in a superimposing manner. As a result, the sufficiently even illuminance distribution is obtained, compared to the apparatus with the glass rod integrator. An even and bright image with excellent color purity is thereby projected onto the screen 20.

[Third Embodiment]

Referring to FIG. 20 to FIG. 23, a third embodiment of the invention will now be described.

Figure 20:
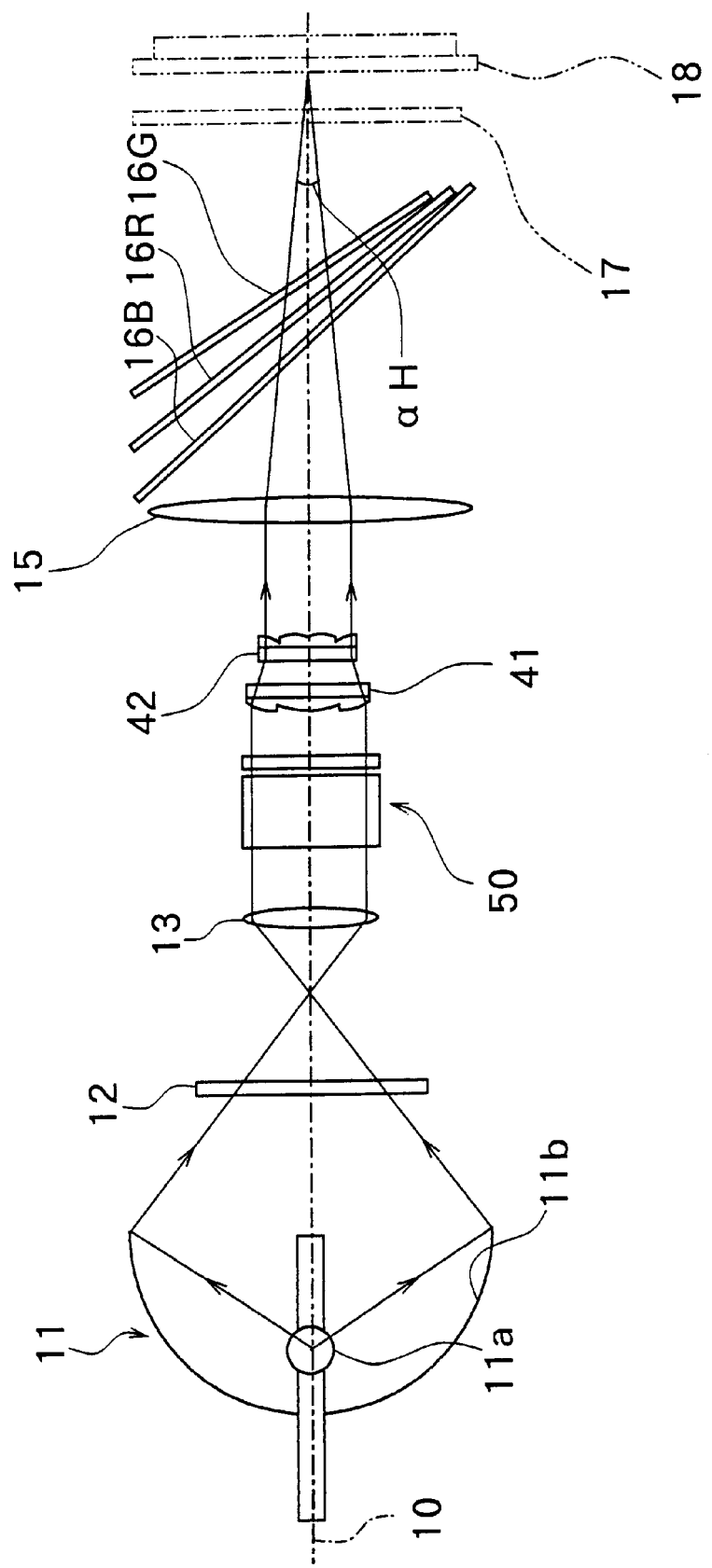
FIG. 20 is a schematic top view of an optical system of a projection-type liquid crystal display apparatus of a third embodiment of the invention.
Figure 21:
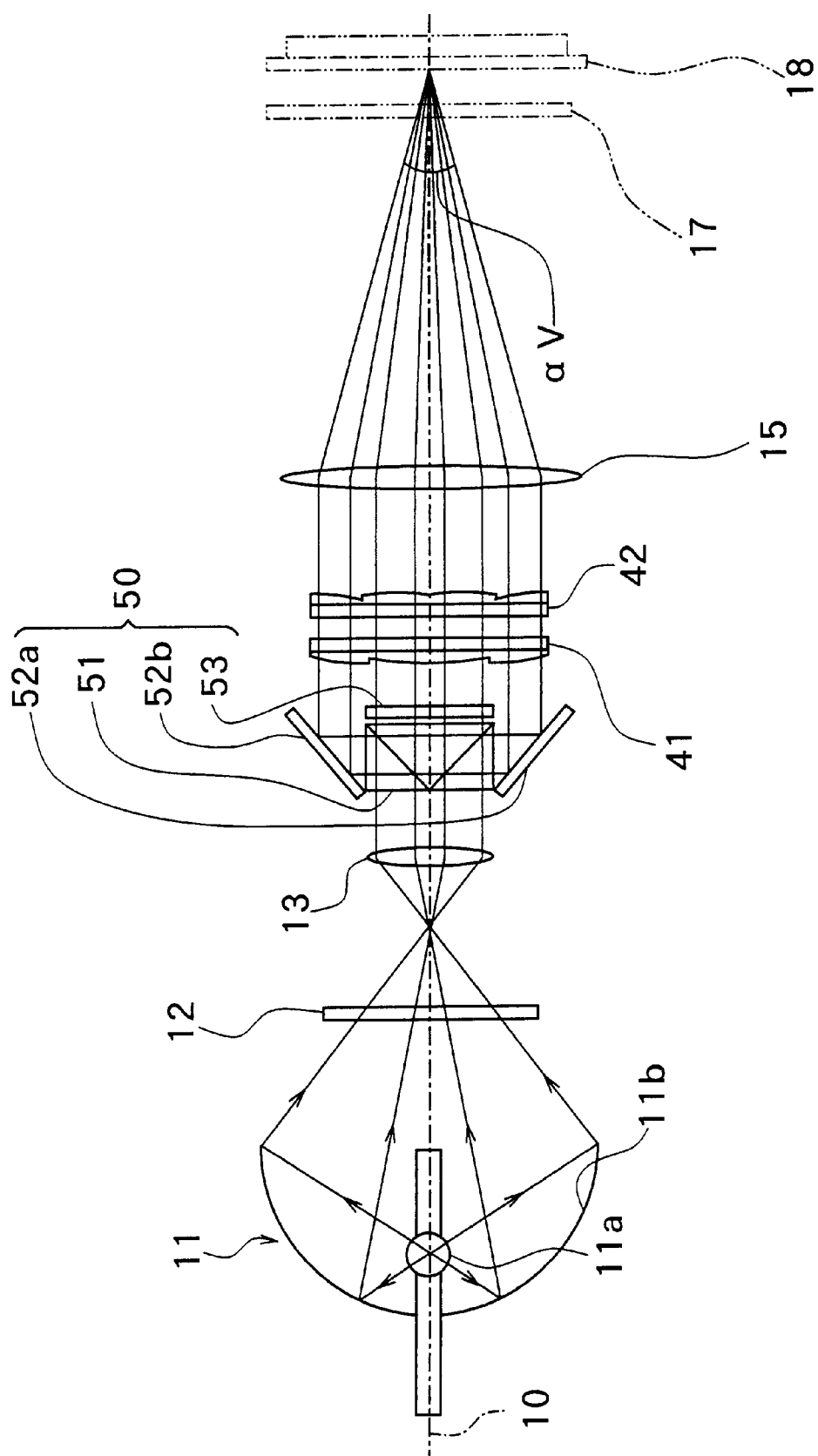
FIG. 21 is a side view of the optical system of the projection-type liquid crystal display apparatus of the third embodiment of the invention.

FIG. 20 and FIG. 21 are schematic views of an optical system of a projection-type liquid crystal display apparatus of the third embodiment of the invention. FIG. 20 is seen from overhead. FIG. 21 is a side view of the apparatus. Like numerals are assigned to components similar to those shown in FIG. 2 and descriptions thereof are omitted if appropriate. In FIG. 20 and FIG. 21, for convenience, the optical paths actually deflected by the dichroic mirrors 16B, 16R and 16G as in FIG. 2 are changed into straight paths in an equivalent manner. For simplicity, main light paths are only shown while the other paths are omitted. In FIG. 20 and FIG. 21, the projection lens 19 and the screen 20 shown in FIG. 2 are omitted. In FIG. 21, the dichroic mirrors 16B, 16R and 16G are omitted, too.

Figure 23:
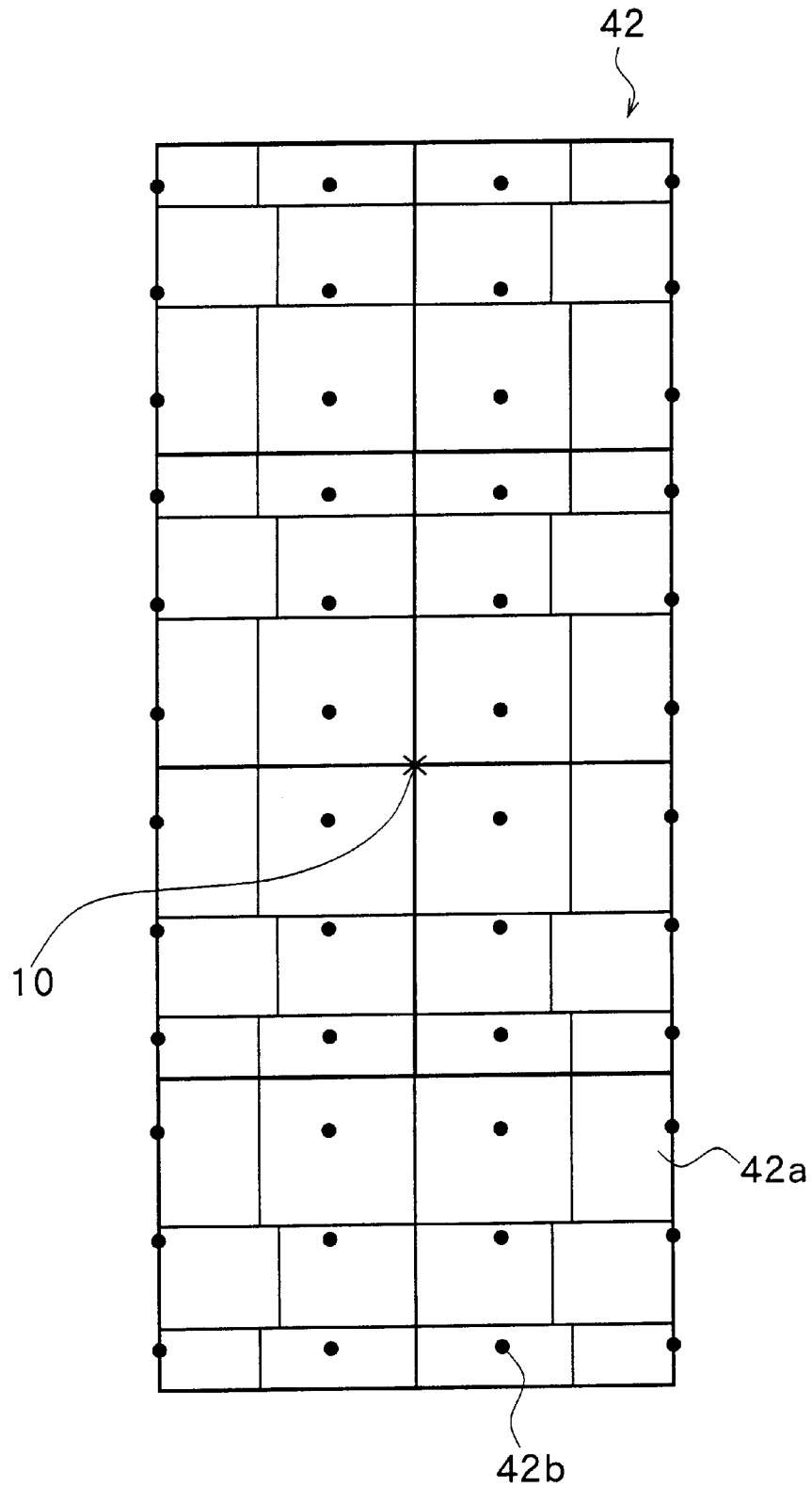
FIG. 23 is a front view of the second lens array shown in FIG. 20.

The apparatus is similar to the apparatuses of the foregoing embodiments of the color-filterless single-panel microlens system except that means are added to the apparatus shown in FIG. 2 and FIG. 13 for achieving higher definition and higher illuminance. In addition to the components shown in FIG. 2 or FIG. 13, the apparatus further comprises a PS splitting and combining device 50 having a function of splitting an incident ray bundle including both p and s polarized rays into a p polarized ray bundle and an s polarized ray bundle and transforming one of the polarized ray bundles into the other polarized ray bundle and combining the ray bundles. Instead of the first lens arrays 21 and 31 and the second lens arrays 22 and 32 shown in FIG. 2 and FIG. 13, the apparatus comprises a first lens arrays 41 and a second lens array 42, each having a shape sufficiently long in the vertical direction. In the apparatus, in order to achieve higher definition, the horizontal length of each pixel aperture of the liquid crystal panel 18 is sufficiently reduced and the pixel is long in the vertical direction. The shape of the perimeter of the second lens array 42 is made similar to the pixel aperture shape as shown in FIG. 23. The PS splitting and combining device 50 corresponds to a 'splitting and combining means' of the invention. The first lens array 41 corresponds to the 'first lens array' of the invention. The second lens array 42 corresponds to the 'second lens array' of the invention.

As shown in FIG. 21, the PS splitting and combining device 50 includes: a polarized light splitting prism 51 having two polarized light splitting mirrors placed nearly orthogonal to each other inside; reflection mirrors 52a and 52b each placed on a side of the prism 51 (in the vertical direction of the apparatus); a half-wave plate 53 placed behind the prism 51 (from which light goes out). In the prism 51, the mirrors are each placed at 45 degrees from the optical axis 10. Of the bundles of rays incident on the prism 51, s polarized light components are reflected at nearly 90 degrees from the optical axis 10 (in the vertical direction of the apparatus). P polarized light components pass through the prism 51 as they are. The s polarized ray bundles each reflected in the vertical direction by the prism 51 are then reflected by the reflection mirrors 52a and 52b in the direction nearly parallel to the optical axis 10 and each enter the upper and lower regions of the first lens array 41. The p polarized ray bundles passing through the prism 51 are transmitted through the half-wave plate 53 behind the prism 51 and transformed into s polarized ray bundles and enter the center region of the first lens array 41. The result is that the device 50 transforms almost every incident ray bundle into s polarized ray bundle and increases the width of the ray bundle in the vertical direction of the apparatus. Alternatively, a polarized light splitting prism having mirrors inside may be used instead of the reflection mirrors 52a and 52b. In this case, the ray bundle split by the prism 51 goes through a medium with higher refraction index, compared to the case where the reflection mirrors 52a and 52b are used. The divergence of the ray bundle is thereby regulated.

Figure 22:
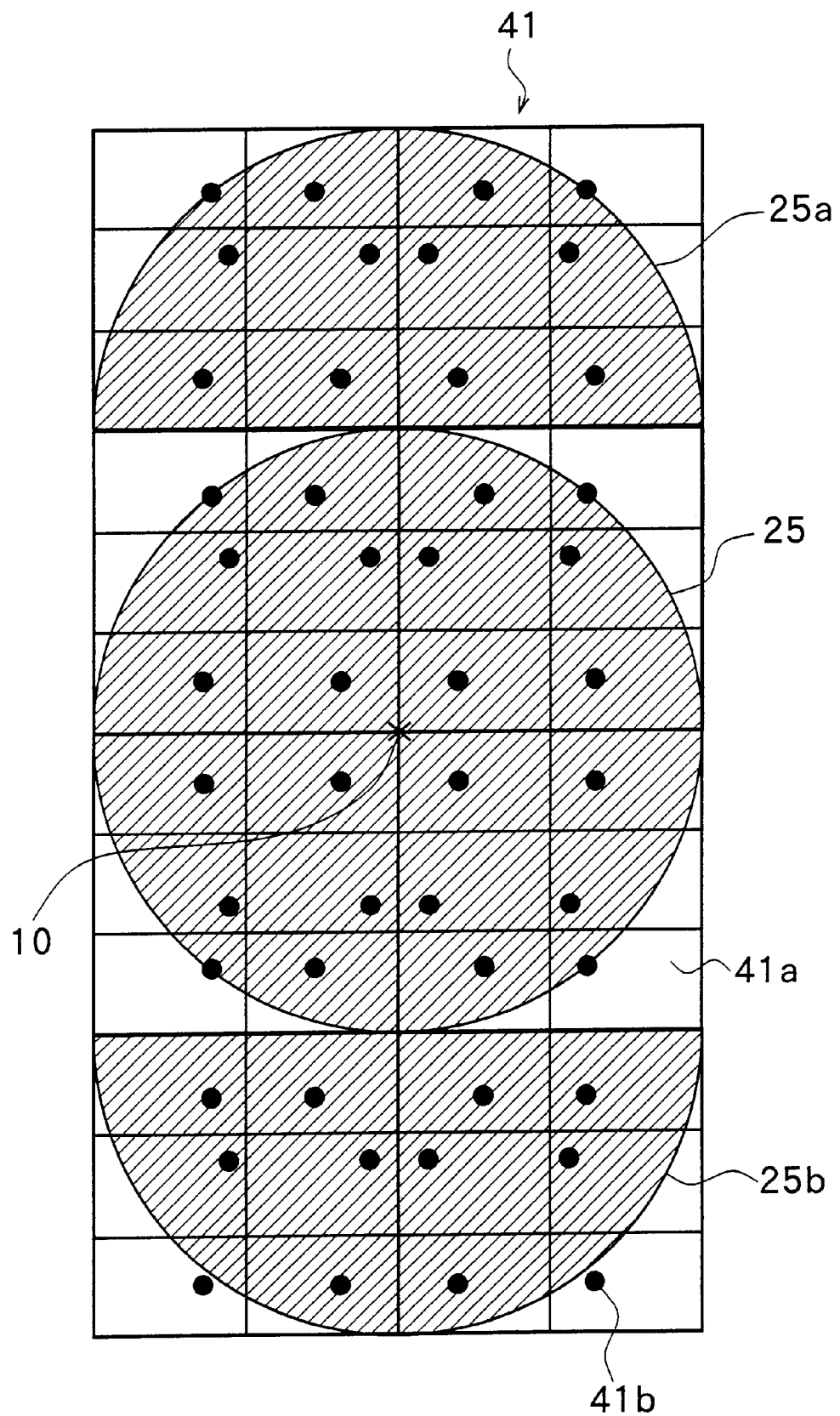
FIG. 22 is a front view of the first lens array shown in FIG. 20.

FIG. 22 illustrates the first lens array 41 on which light is incident. The vertical direction of FIG. 22 corresponds to the vertical direction of the apparatus (that is, the vertical direction of the liquid crystal panel 18). As shown, the first lens array 41 is formed into a vertically long shape wherein twelve lens elements 31a in the first and second quadrants and twelve lens elements 31a in the third and fourth quadrants of the first lens array 31 are each added to the top and bottom of the first lens array 31 of the foregoing second embodiment (FIG. 14). Another numeral 41a is applied to the lens elements in FIG. 22. As in the embodiment shown in FIG. 14, light is incident on the spherical surfaces of the lens elements 41a, a vertex 41b of the sphere of each lens element 41a is decentered, and the shape of each lens element 41a is similar to that of the liquid crystal panel 18.

In FIG. 21, the s polarized ray bundle sent out from the half-wave plate 53 of the device 50 enters the twenty-four lens elements 41a in the center region of the first lens array 41 and form the light source image 25 as shown in FIG. 22. The s polarized ray bundle reflected by the reflection mirrors 52a and 52b of the device 50 enters the twelve lens elements 41a in each of the upper and lower regions of the first lens array 41 and form the light source images 25a and 25b as shown in FIG. 22. The result is that the ray bundle whose cross sectional area is nearly twice as large as that of the original bundle enters all over the first lens array 41.

FIG. 23 illustrates a side of the second lens array 42 from which light goes out. The vertical direction of FIG. 23 corresponds to the vertical direction of the apparatus. As shown, the second lens array 42 is formed into a vertically long shape wherein twelve lens elements 32a in the first and second quadrants and twelve lens elements 32a in the third and fourth quadrants of the second lens array 32 are each added to the top and bottom of the second lens array 32 of the foregoing second embodiment (FIG. 16). Another numeral 42a is assigned to the lens elements in FIG. 23. As in the embodiment shown in FIG. 16, light goes out from the spherical surfaces of the lens elements 42a and a vertex 42b of the sphere of each lens element 42a is decentered. As described above, the vertically long shape of the second lens array 42 is similar to the shape of the pixel aperture of the liquid crystal panel 18.

In the third embodiment, in order to achieve higher definition of a display, the shape of the perimeter of the second lens array 42 is long in the vertical direction. In addition, reduction ratio m' of the second lens array 42 with respect to the pixel size of the liquid crystal panel 18 given by expression (2) is set to a value smaller than that in the second embodiment. The remainder of the configuration is similar to that of the foregoing embodiments.

The function of the projection-type liquid crystal display apparatus will now be described. In the apparatus, a nearly parallel single bundle of rays sent out from the collimator lens 13 nearly orthogonally enter the prism 51. Since the size of the prism 51 is large enough, vignetting of the incident ray bundle is prevented. As described above, s polarized light components of the incident ray bundle are only reflected by the polarized light splitting mirror inside and further reflected by the reflection mirrors 52a and 52b and made into an s polarized ray bundle nearly parallel to the optical axis 10. The ray bundle then enters the first lens array 41. On the other hand, p polarized light components of the incident ray bundle pass through the prism 51 and are transformed into an s polarized ray bundle by the half-wave plate 53. The ray bundle then enters the first lens array 41. Since the size of the first lens array 41 is large enough, vignetting of the incident ray bundle thereon is prevented.

The lens elements 41a of the first lens array 41 split the incident s polarized ray bundle into split ray bundles and have the ray bundles enter the respective lens elements 42a of the second lens array 42. As in the second embodiment, light source images (not shown in FIG. 23) hardly fall off the respective lens elements 42a. As a result, almost every ray incident on the second lens array 42 contributes to illumination of the liquid crystal panel 18.

The split ray bundles sent out from the second lens array 42 are made telecentric by the collimator lens 15 and enter the liquid crystal panel 18 through the incident polarizing plate 17. The rays sent from the lens elements 41a of the first lens array 41 are superimposed on one another so that even illuminance is obtained. A limit is imposed on the incident divergence angle of light incident on the liquid crystal panel 18. The extent of the limit imposed on the angle is different between the horizontal and vertical directions of the pixel aperture, owing to the shape of the perimeter of the second lens array 42. For example, if the ratio of horizontal and vertical directions of the pixel aperture is 1 to 3, incident divergence angle α H (FIG. 20) in the horizontal direction is approximately 5 degrees and incident divergence angle α V (FIG. 21) in the vertical direction is approximately 15 degrees.

In the apparatus, by the function of the PS splitting and combining device 50, the ray bundle incident on the polarizing plate 17 immediately before the liquid crystal panel 18 is almost made into linearly polarized light. Therefore, almost complete linearly polarized light is obtained with little loss as long as the polarization axis of the polarizing plate 17 is set to the polarizing direction of the incident light. Few polarized light components are absorbed by the polarizing plate 17 if a ray bundle previously made into almost linearly polarized light is entered along the polarization axis of the polarizing plate 17 as in the embodiment of the invention, in contrast to the related-art method where light including both p and s polarized light is made into linearly polarized light only by the polarizing plate 17 and consequently any light other than polarizing light components along the polarization axis of the polarizing plate 17 is absorbed and wasted.

According to the projection-type liquid crystal display device of the third embodiment of the invention described so far, the shape of the perimeter of the second lens array 42 is made vertically long in accordance with the vertically long pixel aperture generally utilized in order to achieve high definition. In addition, the shape of the perimeter of the first lens array 41 is made vertically long as well in accordance with the direction of length of the second lens array 42. Furthermore, the PS splitting and combining device 50 is provided in front of the first lens array 41, for extending the width of an incident single ray bundle in the vertical direction and sending out the ray bundle. As a result, limitation of the incident divergence angle is made depending on the aspect ratio of the pixel aperture even if the liquid crystal panel 18 has extremely long and narrow pixel apertures. Color mixture is thereby prevented. An image display with excellent color purity is thus obtained while higher definition is achieved.

According to the embodiment, the PS splitting and combining device 50 is provided in front of the first lens array 41 and almost every ray of the bundle is made into almost linearly polarized light in advance. A loss in light quantity on the polarizing plate 17 is thereby reduced. A reduction in light quantity that results when higher definition is achieved is compensated as well. Still higher luminance of the projected image is thereby achieved.

[Fourth Embodiment]

A fourth embodiment of the invention will now be described.

Figure 24:
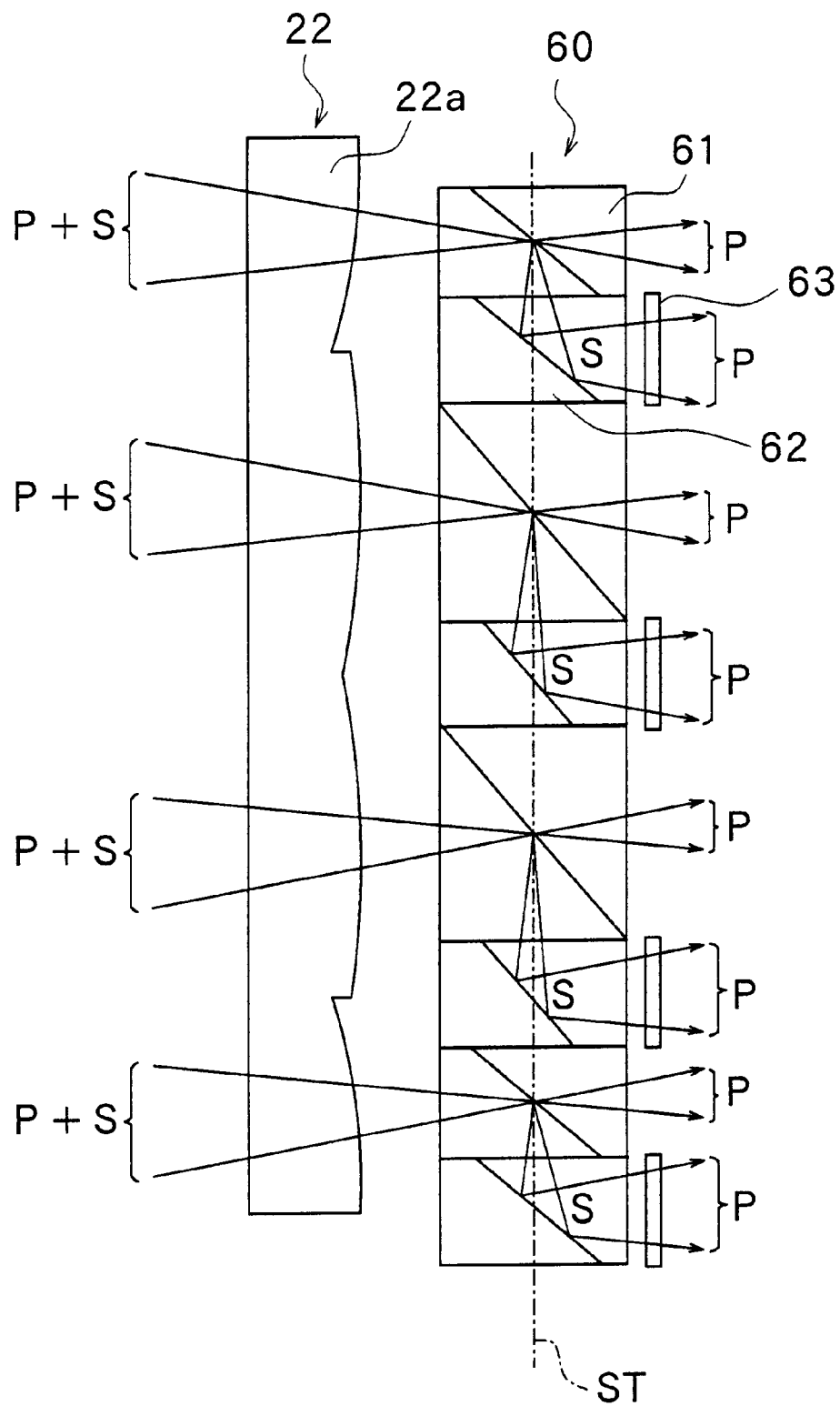
FIG. 24 is a schematic top view of an optical system of a projection-type liquid crystal display apparatus of a fourth embodiment of the invention.

FIG. 24 illustrates the main part of an optical system of a projection-type liquid crystal display apparatus of the fourth embodiment of the invention. In the embodiment, an array of PS splitting and combining device 60 is provided immediately behind the second lens array 22 in the optical system of the foregoing first embodiment (FIG. 2), for example. FIG. 24 shows the enlarged top view of the second lens array 22 and the device 60. The device 60 corresponds to the 'splitting and combining means' of the invention as well.

As shown, the device 60 includes a plurality of units each made up of: a polarized light splitting prism 61 placed in correspondence with the center of each lens element 22a of the second lens array 22; a reflection prism 62 placed between neighboring two lens elements 22a; and a half-wave plate 63 placed behind the reflection prism 62. The splitting prism 61 includes a splitting mirror inside and reflects s polarized light components of the light incident thereon and transmits p polarized light components. The reflection prism 62 includes a total reflection mirror or a splitting mirror and reflects almost every s polarized ray of the bundle incident from the prism 61. The half-wave plate 63 transforms the s polarized ray bundle sent out from the reflection prism 62 into a p polarized ray bundle. In the optical system, in contrast to the foregoing embodiments, the diaphragm position that limits the incident divergence angle of light incident on the liquid crystal panel 18 is the position indicated with ST in FIG. 24. That is, the position is in the plane passing through nearly the center of the mirror of the splitting prism 61. The remainder of the configuration is similar to that of the apparatus shown in FIG. 2.

In the apparatus, as shown in FIG. 24, the split ray bundle including both p and s polarized light sent out from the first lens array 21 goes through the lens elements 21*a*, enters the splitting prism 61, and is condensed on the splitting mirror. S polarized light components of the split ray bundle are reflected by the splitting mirror of the splitting prism 61 and enter the neighboring reflection prism 62. The light components are further reflected by the reflection mirror of the reflection prism 62 and transformed into a p polarized ray bundle by the half-wave plate 63. On the other hand, p polarized light components of the incident split ray bundle are transmitted through the splitting mirror of the splitting prism 61 and sent out as they are. In this way, every split ray bundle sent out from the device 60 is almost made into a p polarized ray bundle and enters the liquid crystal panel 18 through the polarizing plate 17 shown in FIG. 2. In this case, too, there is little loss in light quantity on the polarizing plate 17 as in the third embodiment. The illuminance on the liquid crystal panel 18 is thus enhanced.

According to the embodiment described so far, the PS splitting and combining device 60 is provided behind the second lens array 22 and almost every ray of the bundle is made into almost linearly polarized light in advance. A loss in light quantity on the polarizing plate 17 is thereby reduced and a brighter image is obtained.

The configuration shown in FIG. 24 may be applied to the optical system of the second embodiment (FIG. 13).

The invention is not limited to the embodiments described so far but may be practiced in still other way. For example, the shapes and sizes of the perimeters of the first and second lens arrays forming the integrator and the shapes, sizes and arrangements of the lens elements of the first and second lens arrays are not limited to the foregoing examples but may be appropriately modified and optimized in accordance with the shape of the liquid crystal panel 18 and the shape and size of the pixel aperture.

Immediately behind the polarizing plate 17 of the forgoing embodiments, a phase plate for rotating the polarizing direction by 45 degrees may be added. In this case, the polarizing direction of light incident on the liquid crystal panel 18 forms an angle of about 45 degrees with respect to the plane including the color rays of B, R and G reflected by the dichroic mirrors 16B, 16R and 16G and incident on the liquid crystal panel 18 (that is, the horizontal plane orthogonal to the liquid crystal panel 18). Inconsistencies in color in the horizontal direction of an image are thereby reduced.

Although the spheroid mirror is used as the concave mirror of the light source for enhancing the condensing efficiency, a combination of an aspherical lens and the like with a spherical mirror or a mirror in the shape of a paraboloid of revolution may be alternatively used. Although the liquid crystal panels of the foregoing embodiments are transmission-type panels, reflection-type panels may be alternatively used.

According to the projection-type liquid crystal display apparatus of the invention, the split ray bundles split by the lens elements of the first lens array each enter the respective lens elements of the second lens array. The split ray bundles incident on the lens elements of the second lens array are sent out in such a direction that the split ray bundles are superimposed on one another. The split ray bundles then enter the liquid crystal panel in a superimposing manner through the color separation means. The first and second lens arrays thus function as an integrator and the illuminance on the liquid crystal panel is made even. As a result, the apparatus of the color-filterless single-panel microlens system achieves even luminance of a projected image, in contrast with the apparatus using the related-art rod integrator. Effects of deposited foreign substances such as dust, arc fluctuations of a light source and so on will be reduced as well.

According to the apparatus of the invention, the shape of the whole second lens array may be nearly similar to the shape of an aperture of each of the pixels of the liquid crystal device and the whole second lens array may be conjugated with or nearly conjugated with each of the pixels. As a result, a proper limit is imposed on the incident divergence angle of the ray bundle incident on the liquid crystal panel. That is, the ray bundle incident on the liquid crystal panel is properly reduced in accordance with the aspect ratio of the pixel. The incident divergence angle is optimized both in the horizontal and vertical directions. Consequently, a reduction in light quantity due to a too much reduction in the incident ray bundle is prevented and the efficiency of utilizing light is improved. A bright projected image is thereby obtained. In addition, color mixture that may result when a reduction in the incident ray bundle is insufficient is prevented and color purity of a projected image is improved.

According to the apparatus of the invention, the lens elements of the second lens array may each have a size and a shape that correspond to an optical image formed by the split ray bundle sent out from the corresponding lens element of the first lens array. As a result, most of the light incident on the second lens array reach the liquid crystal panel. A loss in light quantity in the second lens array is further reduced and the efficiency of utilizing light is improved. A bright projected image is thereby obtained.

According to the apparatus of the invention, the whole first lens array may have a size capable of receiving almost all the single ray bundle and the lens elements of the first lens array may be each decentered so that the split ray bundles sent out from the lens elements converge on the corresponding lens elements of the second lens array. The appropriate size of the whole first lens array is thus obtained, regardless of the size of the whole second lens array. Therefore, vignetting of the incident single ray bundle by the first lens array is prevented and the incident light is thereby utilized with high efficiency. The illuminance on the liquid crystal panel is further enhanced and the luminance of the projected image is further improved.

According to the apparatus of the invention, the shape of each of the lens elements of the first lens array may be nearly similar to the shape of the liquid crystal panel and each of the lens elements of the first lens array may be conjugated with or nearly conjugated with the liquid crystal panel. As a result, the split ray bundles split by the lens elements of the first lens array are almost precisely superimposed and projected onto the liquid crystal panel. The rays passing through the first lens array are therefore utilized for illuminating the liquid crystal panel without loss.

The apparatus of the invention may further comprise the splitting and combining means. As a result, almost all the incident rays are formed into rays linearly polarized in a specific direction and utilized. The light quantity lost on the polarizing plate generally placed in front of the liquid crystal panel is thereby reduced. The efficiency of utilizing light is further improved and a bright projected image is thereby obtained.

According to the apparatus of the invention, the splitting and combining means may be placed in front of the first lens array and the apparatus has such a configuration that a ray bundle sent out from the splitting and combining means is enlarged in diameter compared to a diameter of an incident ray bundle and enters the whole first lens array. Consequently, the luminance of a projected image is further improved. In addition, if a liquid crystal panel with extremely long pixels generally utilized in order to achieve high definition is used in the apparatus, the ray bundles are evenly made incident on the whole second lens array whose shape is long and narrow that is similar to that of the pixel aperture. As a result, limitation of the incident divergence angle is properly made depending on the aspect ratio of the pixel aperture. Color mixture is thereby prevented and an image display with excellent color purity is thus obtained while higher definition is achieved.

Obviously many modifications and variations of the present invention are possible in the light of the above teachings. It is therefore to be understood that within the scope of the appended claims the invention may be practiced otherwise than as specifically described.

What is claimed is:

1. A projection-type liquid crystal display apparatus comprising:

a first lens array, including a plurality of lens elements arranged in two dimensions, for splitting an incident single ray bundle into a plurality of split ray bundles by the lens elements and sending out the split ray bundles and condensing the split ray bundles, at least one of said plurality of lens elements of the first lens array having a vertex that is decentered from the lens element perimeter;

a second lens array including a plurality of lens elements arranged in two dimensions in correspondence with the lens elements of the first lens array and sending out the split ray bundles incident thereon through the lens elements of the first lens array in such a direction that the split ray bundles overlap or are superimposed on one another;

a color separation means for separating the ray bundles sent out from the second lens array into rays of a plurality of primary colors and sending out the color rays at angles different from one another; and a liquid crystal panel including: a liquid crystal device having pixels corresponding to the primary colors and modulating the color rays incident on the pixels; and condensing means each provided for every group of the pixels and condensing the color rays sent out from the color separation means and incident at the angles different from one another and having the color rays enter the pixels of the corresponding colors.

2. A projection-type liquid crystal display apparatus according to claim 1, wherein the shape of the second lens array is similar to the shape of an aperture of each of the pixels of the liquid crystal device and the whole second lens array is conjugated with or nearly conjugated with each of the pixels.

3. A projection-type liquid crystal display apparatus according to claim 2, wherein the lens elements of the second lens array each have a size and a shape that correspond to an optical image formed by the split ray bundle sent out from the corresponding lens element of the first lens array.

4. A projection-type liquid crystal display apparatus according to claim 3, wherein the whole first lens array has a size capable of receiving almost all the single ray bundle and the lens elements of the first lens array are each decentered so that the split ray bundles sent out from the lens elements converge on the corresponding lens elements of the second lens array.

5. A projection-type liquid crystal display apparatus according to claim 1, wherein the shape of each of the lens elements of the first lens array is similar to the shape of the liquid crystal panel and each of the lens elements of the first lens array is conjugated with or nearly conjugated with the liquid crystal panel.

6. A projection-type liquid crystal display apparatus according to claim 1, further comprising a splitting and combining means for splitting an incident ray bundle into rays linearly polarized in one direction and rays linearly polarized in another direction orthogonal to the one direction, transforming the rays linearly polarized in one of the directions into rays linearly polarized in the other direction, combining the transformed linearly polarized rays and the untransformed linearly polarized rays into rays linearly polarized in a single direction and sending out the rays.

7. A projection-type liquid crystal display apparatus according to claim 6, wherein the splitting and combining means is placed in front of the first lens array and the apparatus has such a configuration that a ray bundle sent out from the splitting and combining means is enlarged in diameter compared to a diameter of an incident ray bundle and enters the whole first lens array.

8. A projection-type liquid crystal display apparatus according to claim 6, wherein the splitting and combining means is placed behind the second lens array and the splitting and combining means includes a plurality of splitting and combining units for performing splitting and combining of polarized rays on the split ray bundles split by the first lens array and passing through the lens elements of the second lens array and for transforming the rays into rays linearly polarized in a single direction.

* * * * *